(12) United States Patent
Fablet et al.

(10) Patent No.: US 11,201,934 B2
(45) Date of Patent: Dec. 14, 2021

(54) METHODS, DEVICE, SERVER AND COMPUTER PROGRAM PRODUCTS FOR PUSHING DATA IN A NETWORK ENVIRONMENT COMPRISING CACHE SERVERS

(71) Applicant: CANON KABUSHIKI KAISHA, Tokyo (JP)

(72) Inventors: Youenn Fablet, La Dominelais (FR); Hervé Ruellan, Rennes (FR); Romain Bellessort, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 15/746,745

(22) PCT Filed: Jul. 22, 2016

(86) PCT No.: PCT/EP2016/067553
§ 371 (c)(1),
(2) Date: Jan. 22, 2018

(87) PCT Pub. No.: WO2017/017018
PCT Pub. Date: Feb. 2, 2017

(65) Prior Publication Data
US 2018/0227379 A1 Aug. 9, 2018

(30) Foreign Application Priority Data
Jul. 24, 2015 (GB) ...................... 1513130

(51) Int. Cl.
*H04L 29/08* (2006.01)
*G06F 16/957* (2019.01)

(52) U.S. Cl.
CPC .......... *H04L 67/26* (2013.01); *G06F 16/9574* (2019.01); *H04L 67/02* (2013.01); *H04L 67/2842* (2013.01)

(58) Field of Classification Search
CPC ..... H04L 67/26; H04L 67/2842; H04L 67/02; H04L 67/1095; G06F 16/9574
See application file for complete search history.

(56) References Cited

U.S. PATENT DOCUMENTS

| 6,925,485 B1 * | 8/2005 | Wang .................. H04L 67/2847 |
| | | 709/202 |
| 2002/0065938 A1 * | 5/2002 | Jungck .................... H04L 47/19 |
| | | 709/246 |

(Continued)

FOREIGN PATENT DOCUMENTS

| WO | 2015/004276 A2 | 1/2015 |
| WO | WO-2015004276 A2 * | 1/2015 ....... H04N 21/26258 |

OTHER PUBLICATIONS

Nicholas Armstrong, Just-In-Time Push Prefetching: Accelerating the Mobile Web, MS Thesis, Waterloo, Ontario, Canada, 2011 (Year: 2011).*

(Continued)

*Primary Examiner* — David R Lazaro
*Assistant Examiner* — Robert A Shaw
(74) *Attorney, Agent, or Firm* — Canon U.S.A., Inc. IP Division

(57) ABSTRACT

The present invention relates to pushing at least one resource associated with a main resource, in response to a request for this main resource. After having received a request for a main resource and obtained from the cache memory a list of at least one resource linked to the main resource, an indication being associated with the at least one resource, the indication comprising a push policy defined by an application server, the at least one resource stored in the cache memory is pushed in response to a comparison of the indication associated with the at least one resource with a recommendation comprising a preferred push policy.

19 Claims, 22 Drawing Sheets

(56) References Cited

U.S. PATENT DOCUMENTS

| | | | |
|---|---|---|---|
| 2012/0198328 A1* | 8/2012 | Kiley | G06F 16/9537 |
| | | | 715/234 |
| 2013/0246583 A1* | 9/2013 | Bellessort | H04L 67/26 |
| | | | 709/219 |
| 2015/0019676 A1* | 1/2015 | Fablet | G06F 16/9574 |
| | | | 709/213 |
| 2015/0264096 A1* | 9/2015 | Swaminathan | H04N 21/8456 |
| | | | 709/219 |
| 2016/0198012 A1* | 7/2016 | Fablet | H04L 65/608 |
| | | | 709/231 |
| 2016/0248866 A1* | 8/2016 | Garas | H04L 67/2842 |
| 2016/0330269 A1* | 11/2016 | Alstad | H04L 67/42 |
| 2018/0013845 A1* | 1/2018 | Denoual | H04L 67/42 |

OTHER PUBLICATIONS

Sandeep Kumar Soni, Richa Arora, Amit S. Rodge, 'Referer' based Predictive Caching and Session Prefetching for Browser, 2014 Annual IEEE India Conference (INDICON) (Year: 2014).*

* cited by examiner

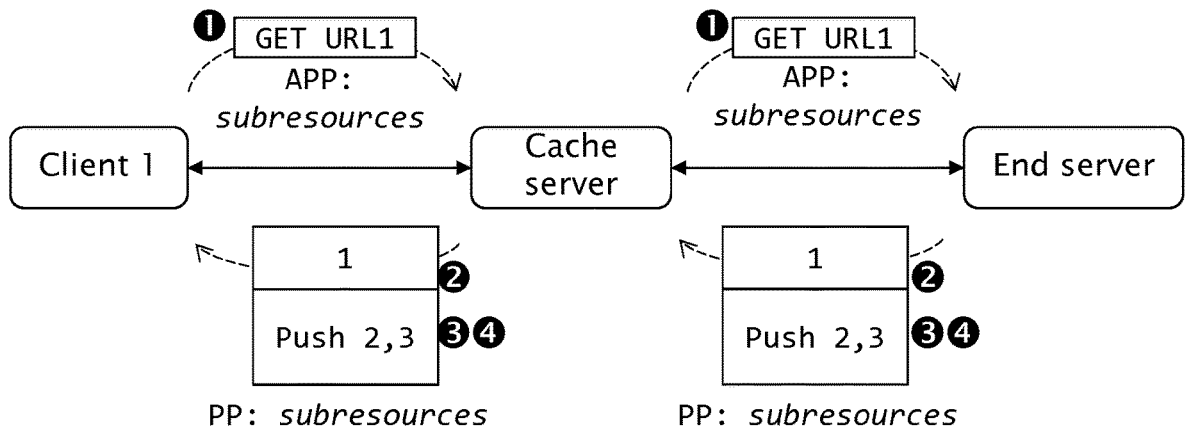

| Request from client to server ❶ |
|---|
| GET /URL1<br>Host: ...<br>Accept-Push-Policy: subresources |

| Response from server to client ❷ |
|---|
| 200 OK<br>Content-Type: text/html<br>Push-Policy: subresources<br><html><br>...<br></html> |

| Push-Promise<br>GET /URL2<br>Host... ❸ |
|---|
| 200 OK<br>Content-Type: text/css<br>Push-Policy: subresources<br>a {<br>}<br>... |

| Push-Promise<br>GET /URL3<br>Host... ❹ |
|---|
| 200 OK<br>Content-Type: text/javascript<br>Push-Policy: subresources<br>function test() {<br>}<br>... |

Fig. 8a

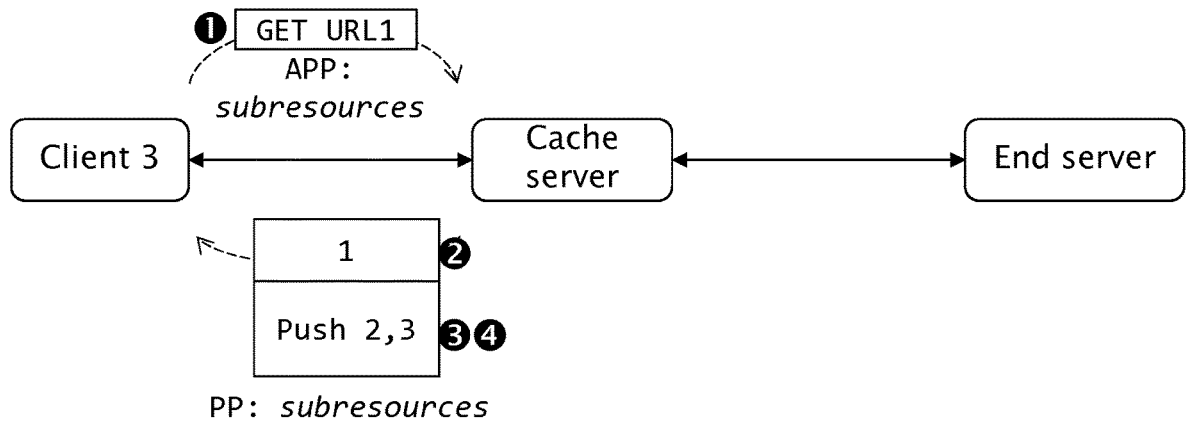

Fig. 8c

| Request from client to server ❶ |
|---|
| GET /URL1<br>Host: ...<br>Accept-Push-Policy: subresources |

| Response from cache server to client ❷ |
|---|
| 200 OK<br>Content-Type: text/html<br>Push-Policy: subresources<br><html><br>...<br></html> |

| Push-Promise<br>GET /URL2 ❸<br>Host... |
|---|
| 200 OK<br>Content-Type: text/css<br>Push-Policy: subresources<br>a {<br>}<br>... |

| Push-Promise<br>GET /URL3 ❹<br>Host... |
|---|
| 200 OK<br>Content-Type: text/javascript<br>Push-Policy: subresources<br>function test() {<br>}<br>... |

| Request from client to server ❶ |
|---|
| GET /URL1<br>Host: ... |

| Response from cache server to client ❷ |
|---|
| 200 OK<br>Content-Type: text/html<br>Push-Policy: none<br><html><br>...<br></html> |

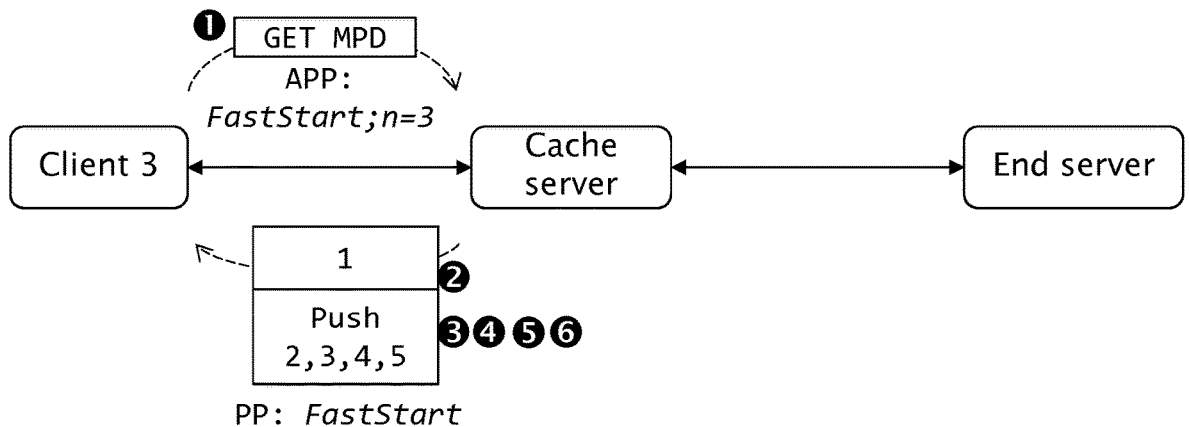

| Request from client to server ❶ |
|---|
| GET /video.mpd<br>Host: ...<br>Accept-Push-Policy: FastStart;n=3 |

| Response from cache server to client ❷ |
|---|
| 200 OK<br>Content-Type: text/xml<br>Push-Policy: FastStart;n=3<br><MPD xmlns="..."><br>...<br></MPD> |

| Push-Promise<br>GET /VIDEO-SEGMENT1.mp4 ❸<br>Host... |
|---|
| 200 OK<br>Content-Type: video/mp4<br>Push-Policy: FastStart;n=3<br>... |

| Push-Promise<br>GET /VIDEO-SEGMENT3.mp4 ❺<br>Host... |
|---|
| 200 OK<br>Content-Type: video/mp4<br>Push-Policy: FastStart;n=3<br>... |

| Push-Promise<br>GET /VIDEO-SEGMENT2.m4s ❹<br>Host... |
|---|
| 200 OK<br>Content-Type: video/mp4<br>Push-Policy: FastStart;n=3<br>... |

| Push-Promise<br>GET /VIDEO-SEGMENT4.m4s ❻<br>Host... |
|---|
| 200 OK<br>Content-Type: video/mp4<br>Push-Policy: FastStart;n=3<br>... |

Fig. 10c

METHODS, DEVICE, SERVER AND COMPUTER PROGRAM PRODUCTS FOR PUSHING DATA IN A NETWORK ENVIRONMENT COMPRISING CACHE SERVERS

CROSS-REFERENCE TO RELATED APPLICATIONS

This application is the National Phase application of PCT Application No. PCT/EP2016/067553, filed on Jul. 22, 2016. This application claims the benefit under 35 U.S.C. § 119(a)-(d) of United Kingdom Patent Application No. GB 1513130.3, filed on Jul. 24, 2015. The above cited patent applications are incorporated herein by reference in their entireties.

FIELD OF THE INVENTION

The present invention relates in general to transmission of data between an application server and a client device in a communication network comprising cache servers, and in particular to methods, devices and computer programs for pushing data in a communication network environment comprising cache servers.

BACKGROUND OF THE INVENTION

HTTP (HyperText Transfer Protocol) is an application protocol used on top of the TCP/IP (Transmission Control Protocol/Internet Protocol) used to transfer data over the Internet. HTTP is the protocol used to exchange or transfer hypertext. It functions as a request-response protocol in the client-server computing model. Accordingly, to obtain data, a client device sends an HTTP request to an application server to obtain these data (also referred to as a resource) and, in response, the application server sends back the data to the client device inside an HTTP response.

It is noted that a web page displayed by a web browser is generally made up of many resources, typically about one hundred elements, also referred to as auxiliary resources. For the sake of illustration, these resources can be HTML (HyperText Markup Language) resources (structuring the content of the page), CSS (Cascading Style Sheets) resources (describing the layout and the style of the content), JavaScript resources (providing dynamic behaviour for the page), image resources and other media or font resources.

In order to display a web page, a client device sends a request to an application server for obtaining the main HTML resource. Once it has received this HTML resource, it parses it to identify other resources that are needed to display the web page. Each time a resource is identified, the client sends a corresponding request to the application server. Such a parsing process is repeated for each newly requested resource.

For example, upon parsing a main HTML resource, a client device may identify a link to a CSS stylesheet. Upon identification, it requests this stylesheet from the application server. Then, when parsing the CSS stylesheet after it has been received, the client device may determine that the stylesheet refers to an image to be used as a background of the web page. Therefore, it will also request this image from the application server.

FIG. 1, comprising FIGS. 1a to 1c, illustrates examples of the structure of HTML web pages formed from several resources (i.e. comprising several elements).

As illustrated in FIG. 1a, web page 100 is composed of a main HTML resource denoted H1 that uses a JavaScript resource, denoted JS1, for handling some dynamic content, and that uses a CSS resource, denoted CSS1, for styling the HTML content of H1.

The structure of web page 105 illustrated in FIG. 1b is more complex than the one of web page 100 in that CSS resource CSS1 comprises a sub-resource consisting of an image denoted IMG1, for example an image to be used as the background of the web page 105.

It is to be noted that both web pages 100 and 105 are simplified examples in comparison to actual web pages. However, although the number of resources of actual web pages may be far greater than the number of resources of web pages 100 and 105, the structures of the web pages are very close.

In order to display these web pages, the client device should first obtain HTML resource H1. In response to this request, the application server sends the HTML resource to the client device.

Once received, HTML resource H1 is parsed to identify the JS1 and CSS1 resources that are needed to display the web page. After they have been identified, they are requested. Likewise, the IMG1 resource is requested after it is identified when parsing the CSS1 resource.

It is observed here that web pages are often dynamic.

FIG. 1c illustrates an updated version of web page 100 illustrated in FIG. 1a, denoted 100'. As illustrated, the CSS resource is no longer CSS1. It has been replaced by CSS2. Accordingly, when parsing the HTML resource H1, after the web page has been updated, the client device will no longer request the CSS1 resource but will request the CSS2 resource.

In order to optimize data communication between application servers and client devices, HTTP defines a mechanism allowing a client device or an intermediary component (that may be, in particular, an independent device or a part of a client device) to store resources received from an application server in a temporary memory (known as a cache memory). This allows a client device to reuse resources that have been previously received without requesting them again from an application server.

For the sake of illustration, since a logo of a company is typically displayed on all the pages of the web site of that company, it is advantageously stored after it has been received so as to be reused to display other pages of the same web site.

In order to optimize the transfer of data between an application server and a client device, HTTP/2 makes it possible for an application server to push data that have not been requested by a client device. Pushing a resource is useful in that it makes it possible for a client device to obtain the different resources it needs more quickly.

To that end, an application server can send a push promise to a client device to forewarn the latter that the application server is intending to push a resource to it. This push promise contains a request to which the pushed resource is a response. Basically, the push promise contains a URI (Uniform Resource Identifier) of the resource the application server is intending to push. This enables the client to know what the application server is promising. The push promise is made by sending a frame of the PUSH_PROMISE type. After having sent the push promise, the application server sends the advertised resource in the same way it would send a response corresponding to a client device's request.

It is to be noted that an application server can only push resources that are in relation to a request sent by a client device. More specifically, a PUSH_PROMISE frame identifies both a client device request and a resource that will be pushed.

Turning back to FIGS. 1a and 1b, an application server can take advantage of the HTTP/2 push feature by pushing the auxiliary resources to improve the loading time of the page. In such a case, JS1 and CSS1 resources (FIG. 1a) and JS1, CSS1, and IMG1 resources (FIG. 1b) can be pushed in response to the request directed to H1 resource.

For the sake of illustration, Jetty is an open source Web server that supports the HTTP/2 push feature. To decide which resources to push in response to a request, Jetty records client device requests. Upon receiving a request for a first resource, Jetty monitors for two seconds all the requests coming from the same client device. Any request referring to the first resource (as determined by the 'Referer' header field) is assumed to be useful for the client device to process the first resource and is therefore added to the list of resources to be pushed upon receiving a request for the first resource.

It is to be noted that if a cache server arranged between a client device and an application server is used to reply to a request from this client device, resources should be pushed in a similar way.

A cache server makes it possible to decrease the response time to a client device request. To that end, the cache server passes responses received from application servers to the requesting client devices and stores the responses along with information regarding the corresponding requests. Then, when the same request is received again, the cache server is able to directly reply to the client device by retrieving the stored response. This enables the client device to receive the response faster and also to decrease the data traffic between a cache server and the application server.

The HTTP/2 push feature also makes it possible to increase the responsiveness viewed from the client device end since an application server sends resources to the client device without waiting for the client device to request them.

FIG. 2, comprising FIGS. 2a to 2d, illustrates an example for obtaining data from an application server through a cache server on a standard basis (FIGS. 2a and 2b) and using the push feature (FIGS. 2c and 2d).

As illustrated in FIG. 2a, the round-trip-time for client device 200 to obtain data from application server 210 via cache server 205 is equal to 300 milliseconds (100 milliseconds from the client device to the cache server plus 50 milliseconds from the cache server to the application server, times two (going back and forth)).

If the same data are cached in cache server 205, the round-trip-time for client device 200 to obtain the data is equal to 200 milliseconds (100 milliseconds from the client device to the cache server times two (going back and forth)), as illustrated in FIG. 2b.

When using the push feature, the round-trip-time for client device 200 to obtain the same data from application server 210 is equal to 150 milliseconds (50 milliseconds from the application server to the cache server plus 100 milliseconds from the cache server to the client device), as illustrated in FIG. 2c.

Finally, when using the push feature, the round-trip-time for client device 200 to obtain the same data from cache server 205 is equal to 100 (from the cache server to the client device), as illustrated in FIG. 2d.

Accordingly, the time period needed to obtain data is significantly reduced when using the push feature and when the data to obtain are cached.

This is of particular interest in the case of DASH (Dynamic Adaptive Streaming over HTTP) for enabling fast start and fast seek as well as for obtaining fast MPD (Media Presentation Description) updates.

However, combining a cache server and the HTTP/2 push feature is complex since an application server (having the knowledge of which resources are to be pushed in regard to a particular request) is not contacted by a cache server to respond to a request (if the response is cached). Therefore, in order for a client device to receive pushed resources when the cache server is replying to a request, the knowledge of the application server has to be transmitted to the cache server. This leads to duplicating the knowledge and to increasing processing resources of cache server.

It should be noted that the HTTP/2 push feature is defined hop-by-hop: there are no constraints in the HTTP/2 specification for establishing a relation between resources pushed by an application server to a cache server in response to a given request to resources pushed by the cache server to a client in response to the same request. The cache server may push the same resources, it may push only some of them, or it may push other resources.

Consequently, there is a need for improving the mechanism for pushing data, in particular for pushing cached data, so that cache servers are able to replicate push decisions made by application servers.

SUMMARY OF THE INVENTION

The present invention has been devised to address one or more of the foregoing concerns.

In this context, there is provided a solution for pushing data from an application server to a client device through one or more cache servers.

According to a first object of the invention, there is provided a method for pushing at least one resource associated with a main resource, in response to a request for this main resource, the method being carried out in an intermediary component comprising a cache memory, the method comprising:

receiving a request for a main resource;

obtaining from the cache memory a list of at least one resource linked to the main resource, an indication being associated with the at least one resource, the indication comprising a push policy defined by an application server;

pushing the at least one resource stored in the cache memory in response to a comparison of the indication associated with the at least one resource with a recommendation comprising a preferred push policy.

Therefore, the method of the invention makes it possible to optimize the use of the bandwidth between cache servers and application servers and to improve the responsiveness for pushing resources in a communication network comprising cache servers.

In an embodiment, the method further comprises a step of receiving the recommendation comprising the preferred push policy, the recommendation being received along with the request for the main resource.

In an embodiment, the method further comprises a step of transmitting the indication associated with the at least one resource.

In an embodiment, the method further comprises steps of, establishing a link between the main resource and a resource to push; and associating with the linked resource to push an indication comprising a push policy defined by an application server, enabling the selection of the resource to push as a function of a recommendation comprising a preferred push policy.

In an embodiment, the method further comprises a step of receiving the indication comprising a push policy defined by an application server.

In an embodiment, the indication comprising a push policy defined by an application server is received from the application server, directly or indirectly.

In an embodiment, the method further comprises a step of transmitting the indication used to identify the at least one pushed resource.

In an embodiment, the method further comprises a step of selecting a subset of resources to push among a set of resources to push, the subset of resources to push being selected in response to the comparison of an item of information of the indication, different from the push policy, with the recommendation, or in response to the comparison of an item of information of the indication, different from the push policy, with an item of information of the recommendation, different from the preferred push policy.

In an embodiment, the item of information of the indication is received along with this resource to push.

In an embodiment, the item of information of the recommendation is received along with the request for the main resource.

In an embodiment, the method further comprises a step of identifying from the cache memory at least one resource as a function of an indication associated with another resource, the indication associated with the other resource comprising a push policy defined by an application server, and a step of transmitting the identified resource.

In an embodiment, the indications and the recommendations are received and transmitted as header parameters.

According to a second object of the invention, there is provided a method for pushing at least one resource associated with a main resource, in response to a request for this main resource, the method being carried out in an application server, the method comprising:

receiving a request for a main resource;

identifying at least one resource associated with the main resource, as a function of recommendation comprising a preferred push policy; and pushing the at least one identified resource and an indication comprising a push policy, the indication being based on the recommendation comprising a preferred push policy.

Therefore, the method of the invention makes it possible to optimize the use of the bandwidth between cache servers and application servers and to improve the responsiveness for pushing resources in a communication network comprising cache servers.

In an embodiment, the method further comprises a step of receiving the recommendation comprising a preferred push policy.

In an embodiment, the method further comprises a step of forming at least one group of resources to push.

In an embodiment, at least one group of resources to push is associated with a particular main resource.

In an embodiment, the transmitted indication further comprises an item of information enabling an intermediary component to select a resource to push, the item of information being different from the push policy.

In an embodiment, the recommendation further comprises an item of information enabling selection of a resource to push, the item of information being different from the preferred push policy.

In an embodiment, the item of information comprises a validity period, a resource version, or a varying parameter of a resource.

According to a third object of the invention, there is provided a device for pushing at least one resource associated with a main resource, in response to a request for this main resource, the device comprising a cache memory and a processor configured for carrying out the steps of:

receiving a request for a main resource;

obtaining from the cache memory a list of at least one resource linked to the main resource, an indication being associated with the at least one resource, the indication comprising a push policy defined by an application server;

pushing the at least one resource stored in the cache memory in response to a comparison of the indication associated with the at least one resource with a recommendation comprising a preferred push policy.

Therefore, the device of the invention makes it possible to optimize the use of the bandwidth between cache servers and application servers and to improve the responsiveness for pushing resources in a communication network comprising cache servers.

In an embodiment, the processor is further configured to carry out a step of receiving the recommendation comprising the preferred push policy, the recommendation being received along with the request for the main resource.

In an embodiment, the processor is further configured to carry out a step of transmitting the indication associated with the at least one resource.

In an embodiment, the processor is further configured to carry out steps of, establishing a link between the main resource and a resource to push; and associating with the linked resource to push an indication comprising a push policy defined by an application server, enabling the selection of the resource to push as a function of a recommendation comprising a preferred push policy.

In an embodiment, the processor is further configured to carry out a step of receiving the indication comprising a push policy defined by an application server.

In an embodiment, the processor is further configured so that the indication comprising a push policy defined by an application server is received from the application server, directly or indirectly.

In an embodiment, the processor is further configured to carry out a step of transmitting the indication used to identify the at least one pushed resource.

In an embodiment, the processor is further configured to carry out a step of selecting a subset of resources to push among a set of resources to push, the subset of resources to push being selected in response to the comparison of an item of information of the indication, different from the push policy, with the recommendation, or in response to the comparison of an item of information of the indication, different from the push policy, with an item of information of the recommendation, different from the preferred push policy.

In an embodiment, the processor is configured so that the item of information of the indication is received along with this resource to push.

In an embodiment, the processor is configured so that the item of information of the recommendation is received along with the request for the main resource.

In an embodiment, the processor is further configured to carry out a step of identifying from the cache memory at least one resource as a function of an indication associated with another resource, the indication associated with the other resource comprising a push policy defined by an application server, and a step of transmitting the identified resource.

In an embodiment, the processor is configured so that the indications and the recommendations are received and transmitted as header parameters.

According to a fourth object of the invention, there is provided a server for pushing at least one resource associated with a main resource, in response to a request for this main resource, the server comprising a processor configured for carrying out the steps of:

receiving a request for a main resource;

identifying at least one resource associated with the main resource, as a function of recommendation comprising a preferred push policy; and pushing the at least one identified resource and an indication comprising a push policy, the indication being based on the recommendation comprising a preferred push policy.

Therefore, the server of the invention makes it possible to optimize the use of the bandwidth between cache servers and application servers and to improve the responsiveness for pushing resources in a communication network comprising cache servers.

In an embodiment, the processor is further configured to carry out a step of receiving the recommendation comprising a preferred push policy.

In an embodiment, the processor is further configured to carry out a step of forming at least one group of resources to push.

In an embodiment, at least one group of resources to push is associated with a particular main resource.

In an embodiment, the transmitted indication further comprises an item of information enabling an intermediary component to select a resource to push, the item of information being different from the push policy.

In an embodiment, the recommendation further comprises an item of information enabling selection of a resource to push, the item of information being different from the preferred push policy.

In an embodiment, the item of information comprises a validity period, a resource version, or a varying parameter of a resource.

Since the present invention can be implemented in software, the present invention can be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 8a, 8b, and 8c, illustrate the scenario described by reference to FIGS. 3a, 3b and 3c with more details regarding the request, the response to the request, and the pushed resources for which details of the HTTP headers are given;

FIGS. 10a, 10b, and 10c, illustrate a scenario for replaying a push strategy in a cache server in the context of DASH video streaming;

DETAILED DESCRIPTION OF EMBODIMENTS OF THE INVENTION

According to general embodiments, the behaviour of the push mechanism implemented in a server is replicated in cache servers, without its complexity, so that the cache servers can answer client devices in lieu of application servers with cached versions of the resources. Accordingly, not only the resources are cached but also links between main resources and pushed resources. More precisely, each link associates a main resource with at least one pushed resource and comprises an item of information (that may also be called a type characterizing the link) provided by an application server, directly or via another cache server.

Still according to general embodiments, specific headers are used in the requests and in the responses. More precisely, a 'Push-Policy' header is introduced in responses sent by application servers. It identifies the push policy used by the application server to select a resource to push.

Such a 'Push-Policy' header is used in conjunction with an 'Accept-Push-Policy' header that can be used by a client device to indicate which kind of pushed resources the client device agrees to receive.

This push-policy header is useful for cache servers to cache not only the resources but also the links between resources (main resources and pushed resources) as well as the validity of the links.

According to embodiments, cache servers use the 'Accept-Push-Policy' headers of client device requests to identify links between cached main resources and auxiliary resources that can be pushed. Accordingly, each link that is identified as a function of a received request leads to pushing the corresponding auxiliary resources to the corresponding client device.

Figure 3A:
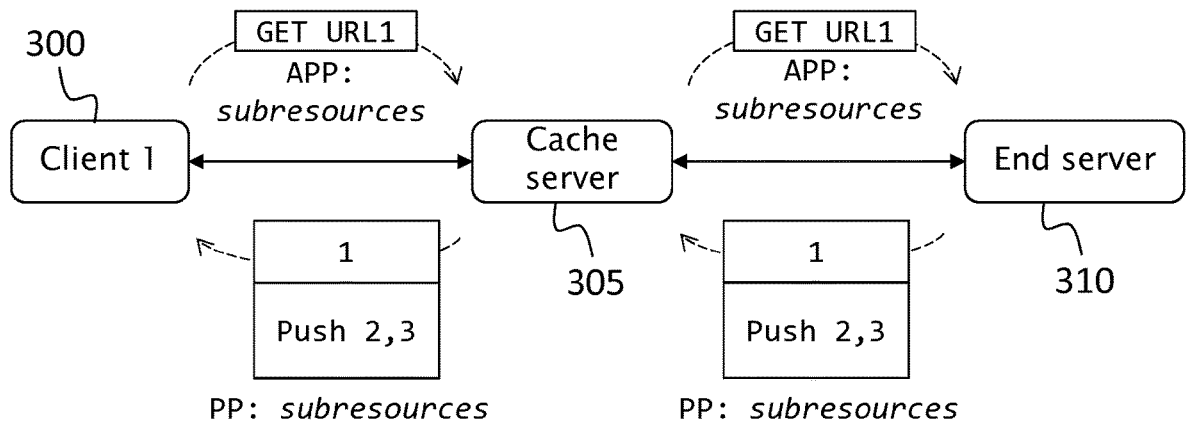
FIGS. 3a, 3b, and 3c, illustrate several scenarios of embodiments of the invention for caching and pushing data to a client device in an environment in which the client device is connected to an application server via a cache server.
Figure 3B:
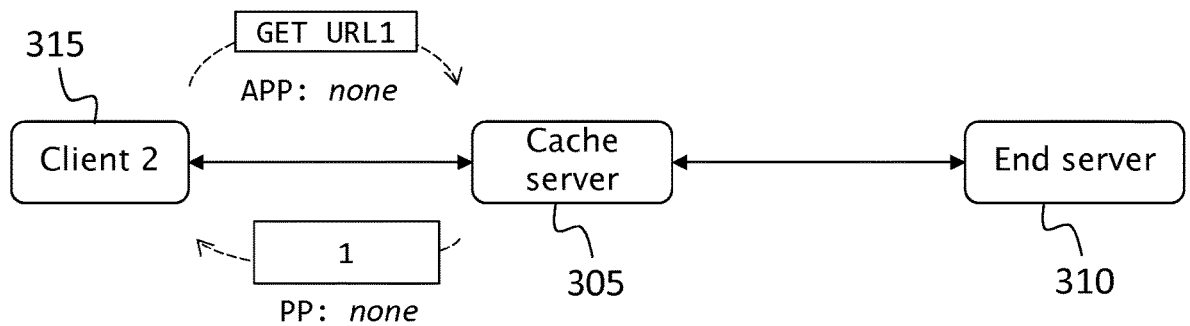
Figure 3C:
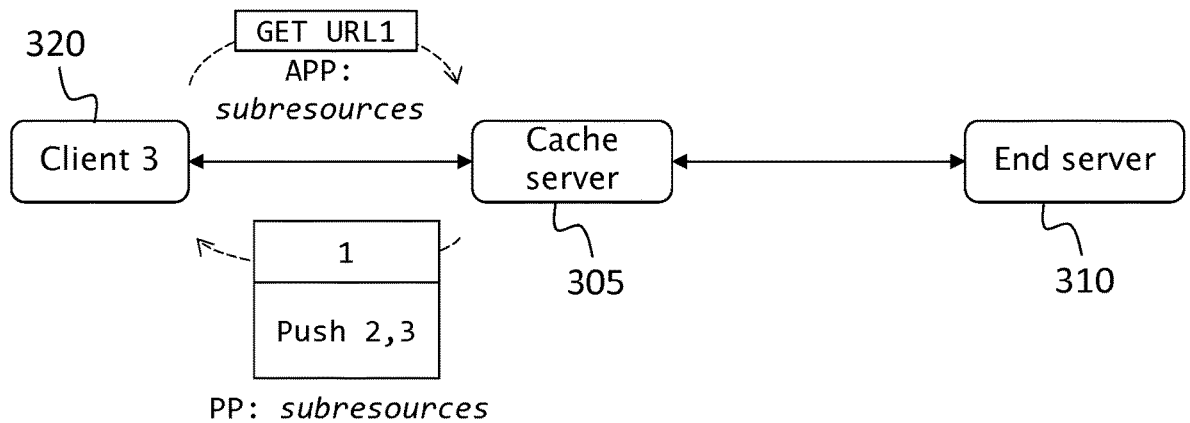

FIG. 3, comprising FIGS. 3a, 3b, and 3c, illustrates several scenarios of embodiments of the invention for caching and pushing data to a client device in an environment in which the client device is connected to an application server via a cache server.

The algorithms used for carrying out the steps illustrated in FIGS. 3a to 3c are described by reference to FIGS. 4 to 7.

Figure 1A:
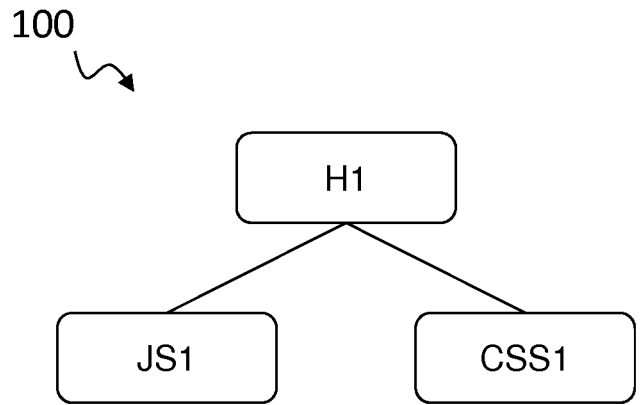
FIGS. 1a to 1c, illustrate examples of the structure of HTML web pages formed from several resources.
Figure 1B:
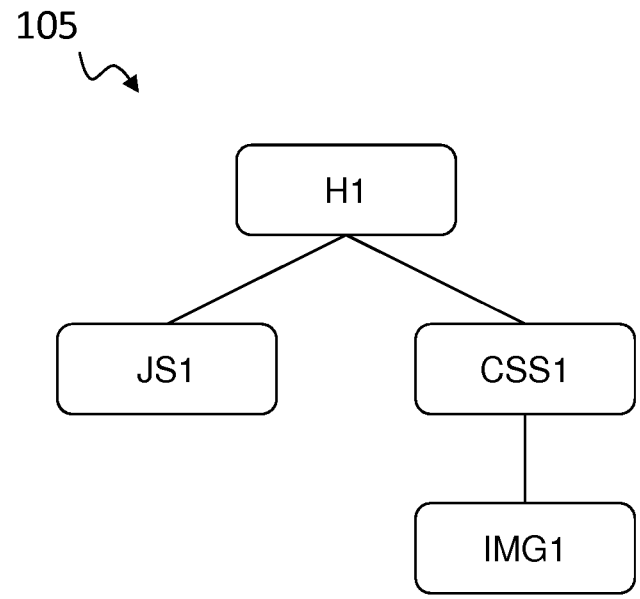
Figure 1C:
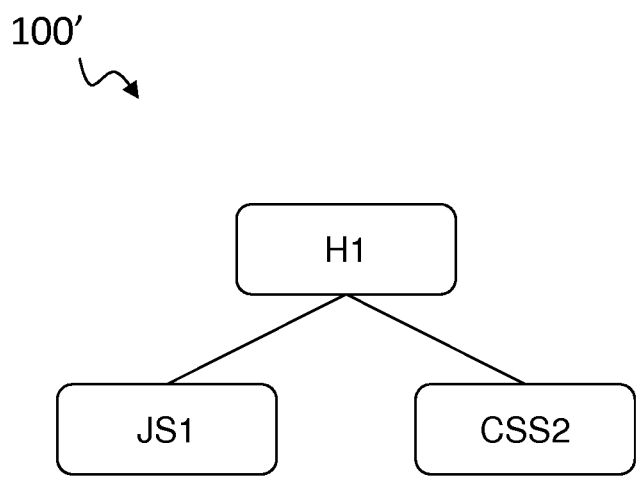
Figure 2A:
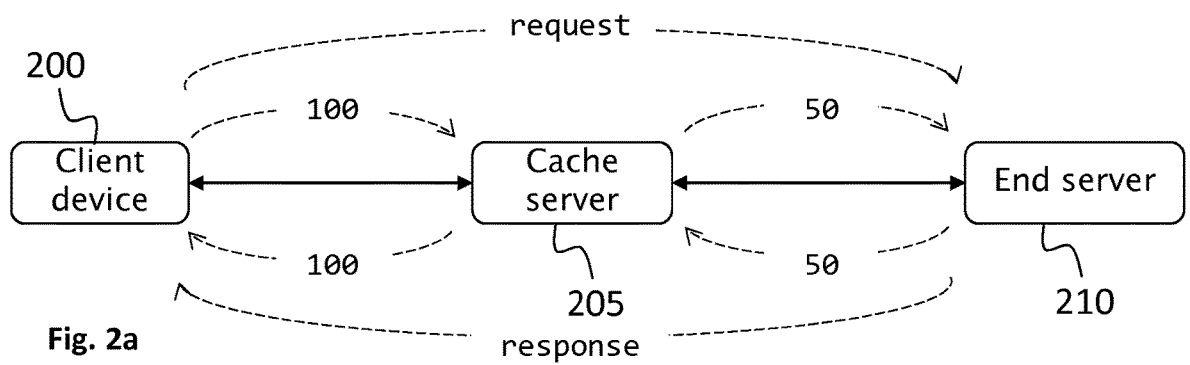
FIGS. 2a to 2d, illustrate an example for obtaining data from an application server through a cache server on a standard basis (FIGS. 2a and 2b) and using the push feature (FIGS. 2c and 2d)
Figure 2B:
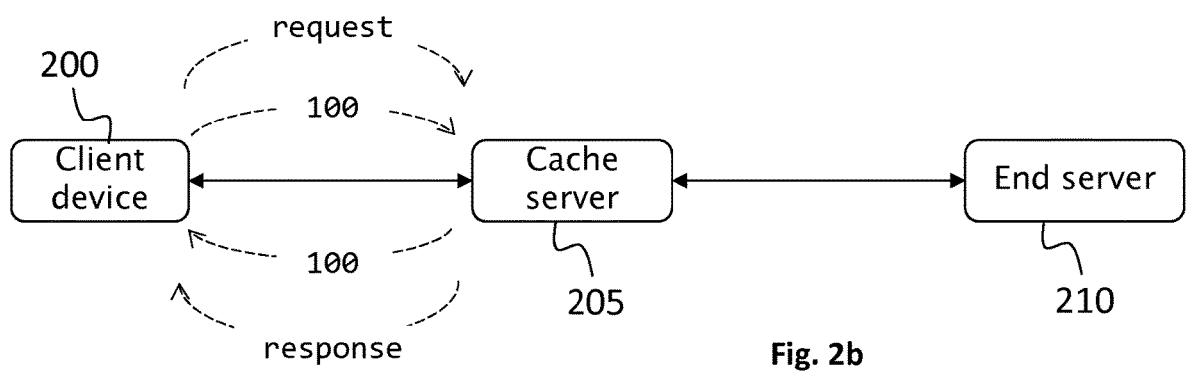
Figure 2C:
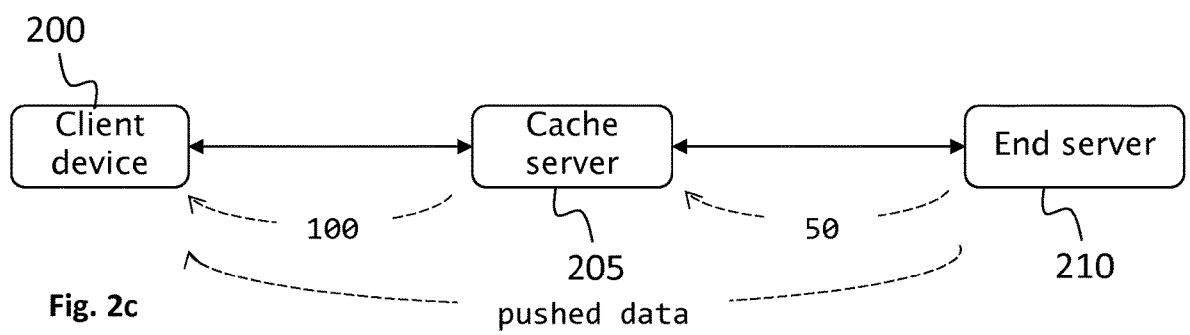
Figure 2D:
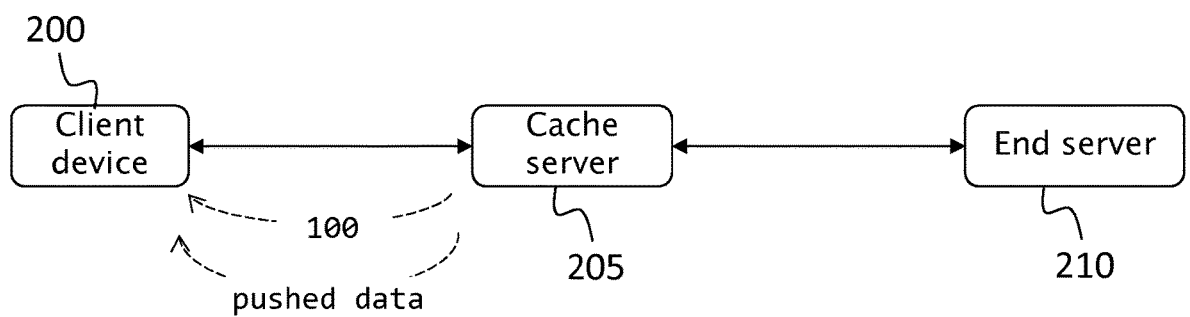

FIG. 3a illustrates a simple scenario for accessing a web page such as web page 100 of FIG. 1a, composed of main resource '1' that uses resource '2' and resource '3'.

As illustrated, client device 300 sends a request to cache server 305 to obtain main resource '1'. Since the resource itself is to be obtained, the request is typically a request of the GET type comprising a URL of resource '1' (URL1). Client device 300 sets the 'Accept-Push-Policy' header (APP) of the request to 'subresources' so as to indicate that it agrees to receive auxiliary resources (or subresources) that would be pushed.

Since the response to the request is not cached in cache server 305, the request is forwarded to application server 310. The 'Accept-Push-Policy' header of the request is not modified (i.e., the 'Accept-Push-Policy' header is set to 'subresources').

Application server 310 replies to the request by sending resource '1' to cache server 305 and by pushing resources '2' and '3' to cache server 305. As illustrated, the 'Push-Policy' header of the response to the request is set to the same push policy as the request itself (i.e., the 'Push-Policy' header of the response is set to 'subresources').

Upon receiving resource '1', cache server 305 forwards it to client device 300, in response to the initial request.

In addition, cache server 305 replicates the pushes made by application server 310, by pushing resources '2' and '3' to client device 300, in connection with the initial request for obtaining resource '1'.

The cache server also stores all the resources '1', '2', and '3" in its cache memory for future uses along with links linking resource '1' to resources '2' and '3'. These links store the indication that when the 'Accept-Push-Policy' header of a request is set to 'subresources' by a client device requesting resource '1', the cache server expects resources '2' and '3' to be pushed.

FIG. 3b illustrates another scenario for accessing the same web page as the one accessed in the scenario illustrated in FIG. 3a, after this page has been accessed by a first client device, i.e., when the requested resources are stored in the cache memory of the cache server. However, in this case, the client device has decided to not accept auxiliary resources that would be pushed.

As illustrated, client device 315 sends a request to cache server 305 to obtain the main resource '1'. Again, the request is typically a request of the GET type comprising an URL of resource '1'. Moreover, client device 315 sets the 'Accept-Push-Policy' header of the request to 'none' so as to indicate that it does not agree to receive pushed auxiliary resources.

Since resource '1' has been already stored in the cache memory of cache server 305, the latter fetches the resource from its cache memory to send it back to the client device, upon reception of the request for the same resource '1'.

When comparing the 'Accept-Push-Policy' header of the request for resource '1' with the 'Push-Policy' stored within the links between the requested resource '1' and the resources '2' and '3' (these links and these resources being stored in the cache memory of the cache server), the cache server determines that the policies are not the same (these policies are set to 'subresources' and 'none', respectively). Accordingly, the cache server does not push the linked resources '2' and '3'.

FIG. 3c illustrates another scenario for accessing the same web page as the one accessed in the scenario illustrated in FIG. 3a, after this page has been accessed by a first client device, i.e., when the requested resources are stored in the cache memory of the cache server. According to this example, the client device has decided to accept auxiliary resources that would be pushed.

As illustrated, client device 320 sends a request to cache server 305 to obtain the main resource '1'. Again, the request is typically a request of the GET type comprising a URL of resource '1'. Moreover, client device 320 sets the 'Accept-Push-Policy' header of the request to 'subresources' so as to indicate that it agrees to receive pushed auxiliary resources.

Since resource '1' has been already stored in the cache memory of cache server 305, the latter fetches the resource from its cache memory to send it back to the client device, upon reception of the request for the same resource '1'.

When comparing the 'Accept-Push-Policy' header of the request for resource '1' with the 'Push-Policy' stored within the links between the requested resource '1' and the resources '2' and '3' (these links and these resources being stored in the cache memory of the cache server), the cache server determines that the policies are the same (these policies are both set to 'subresources'). Accordingly, the cache server pushes the linked resources '2' and '3'.

Figure 4:
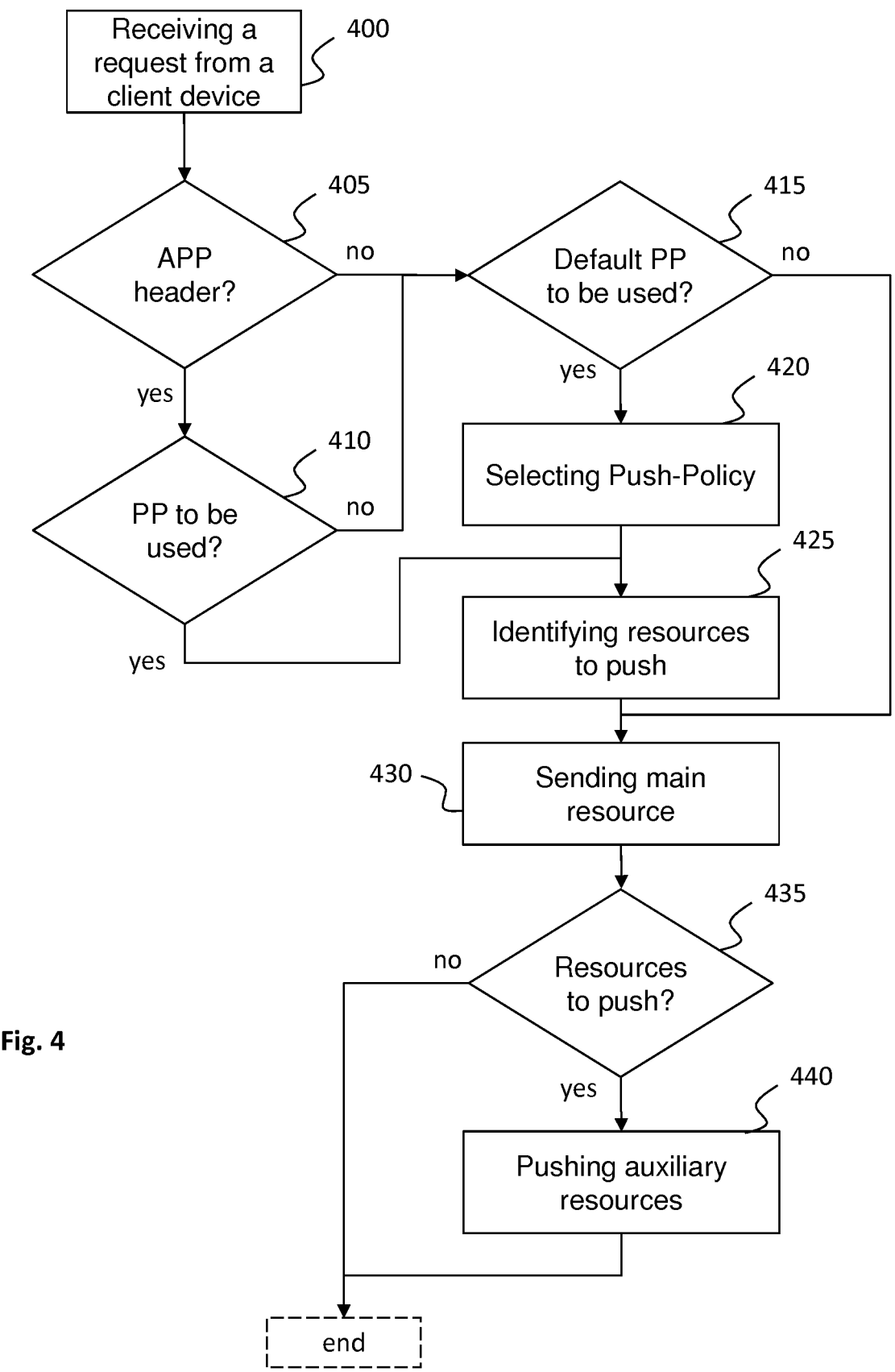
FIG. 4 illustrates steps of an example of algorithm carried out in an application server for processing a request and for generating a response to this request.

FIG. 4 illustrates some steps of an example of an algorithm implemented in an application server for processing a request and for generating a response to this request.

As illustrated, a first step is directed to receiving a request from a client device (step 400) via one or several cache servers.

Then, the application server checks whether or not the request comprises an 'Accept-Push-Policy' header (step 405). If the request comprises an 'Accept-Push-Policy' header, the application server determines which push policy is to be used among the one or more defined in the 'Accept-Push-Policy' header and/or among the one or more push policies handled by the application server that comply with the push policy provided by the client device (step 410). If several push policies could be used, the application server selects the most suitable.

On the contrary, if no push policy handled by the application server complies with the push policy provided by the client device or if the request does not comprise an 'Accept-Push-Policy' header, the application server determines whether or not a push policy may be used as a default push policy (step 415), based on some configuration files. If a default push policy can be used, it is selected (step 420).

According to a particular embodiment, if a default push policy may be used, it is selected.

For the sake of illustration, an application server may decide to use a default "subresources" push policy for all the responses regarding requests for resources of the 'index.html' URL type.

It is to be noted that according to a particular embodiment, if a client device sends a request comprising an 'Accept-Push-Policy' header set to 'none' (meaning that the application server should not push any resource), the application server should use this policy if no other push policy is found suitable.

Next, the auxiliary resources to push, if any, are identified as a function of the requested resource and of the selected push policy (step 425). This selection may be made using pre-defined rules.

According to a particular example, a configuration file may contain the list of resources to push based on the request URL. For the sake of illustration, the following example defines the rule whereby the resources 'bootstrap.js' and 'bootstrap.css' should be pushed for any request for an HTML file if the 'Accept-Push-Policy' header of the request is set to 'subresources'. It also indicates that the '/resources/thumbnail.jpg' resource should be pushed in any case when the '/media.css' resource is requested.

```
/*.html
    PUSH(subresources): /resources/bootstrap.js
    PUSH(subresources): /resources/bootstrap.css
/media.css
    PUSH(*): /resources/thumbnail.jpg
```

The selection of the resources to push may also be based on an analysis of the content of the requested resource. For example, if the requested resource is a text file, it may be parsed so that the links contained in the file may be analysed in order to select and to push relevant linked resources. This is particularly useful in the case of HTML files containing links set as prefetch, as illustrated in the following example. In such a case, the chances are high that the client device will request these resources.

```
<html>
<head>
    <link rel='prefetch' href='myscript.js'>
    <link rel='next' href='next.html'>
</head>
<body>
Main super page of a super web site.
<div>...</div>
</body>
```

According to particular embodiments, this analysis may be made based on server application defined headers such as 'Link' headers, which are the HTTP header translation of link HTML elements.

Still according to particular embodiments, this analysis may also be made on multimedia presentation description (MPD) manifests that are typically used in the context of video streaming. These MPD manifests contain links to sub-resources such as video segments, audio tracks, and subtitles. Selection of the resources to push may be based on these links and on metadata found either as configuration files, within the MPD manifest or statically defined in the application server algorithm. A configuration setting may be to select all initialization segment links for the lowest quality. For the sake of illustration, an example of a partial MPD manifest is given:

```
<?xml version="1.0" encoding="UTF-8"?>
<MPD xmlns="urn:mpeg:DASH:schema:MPD:2011">
...
<SegmentTemplate initialization="segment_init.mp4"/>
<Representation id="320x240" mimeType="video/mp4"
media="segment.m4s" />
...
</MPD>
```

Turning back to FIG. 4, once the auxiliary resources have been selected or in parallel to the auxiliary resource selection, the application server sends the requested resource as a response (step 430).

According to embodiments, a 'Push-Policy' header set to the selected push policy (if any) is included in the response.

Then, it is determined whether or not auxiliary resources are identified as resources to be pushed (step 435). If there are auxiliary requests to push, they are sent in parallel to the main resource or sequentially (step 440). According to particular embodiments, the pushed resources also contain a 'Push-Policy' header that may comprise additional information that is specific to each pushed resource such as a validity period or a scope and more generally any parameter that may help a cache server to replay the application server push policy.

Figure 5:
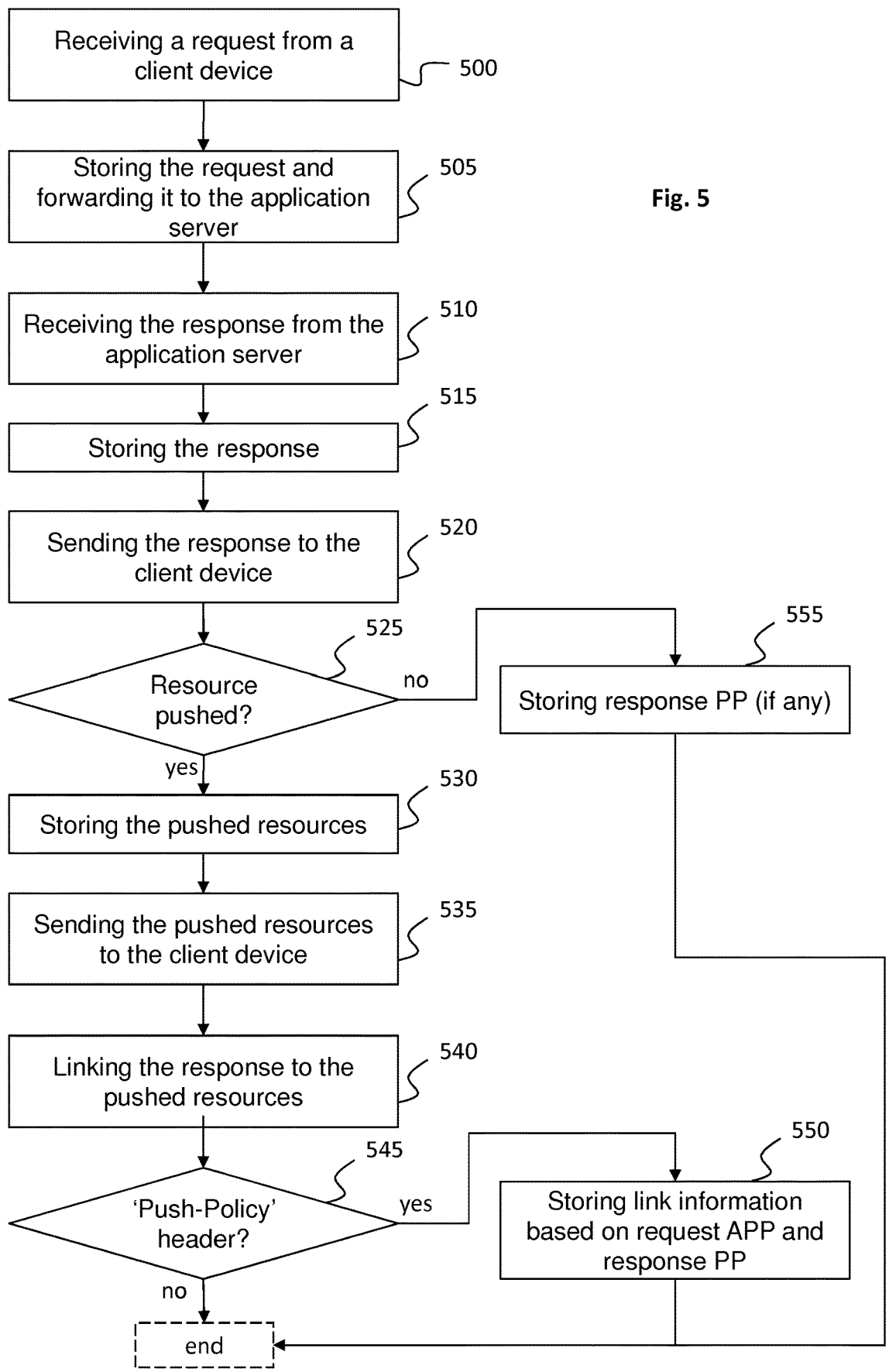
FIG. 5 illustrates an example of steps of an algorithm for processing a response received by a cache server from an application server (directly or via a cache server) in response to a previous request for a main resource.

FIG. 5 illustrates an example of steps of an algorithm for processing a response received by a cache server from an application server (directly or via a cache server) in response to a previous request for a main resource.

An object of the algorithm illustrated in FIG. 5 is both to update the cache memory of the cache server implementing the algorithm and to transmit the response of the application server to the client device.

As illustrated, a first step is directed to receiving a request from a client device (step 500), directly or via another cache server.

Next, the request is stored in the cache server and transmitted to an application server (step 505), directly or via another cache server.

The request is stored within the cache server until a response to this request is received from an application server (again, directly or via another cache server). The response to the request typically comprises the requested resource. It may also comprise metadata associated with the requested resource. According to a particular embodiment, the response may comprise only metadata, for example metadata indicating that the resource is already available within the cache server and that it is valid.

When the response is received from the application server (step 510), it is stored by the cache server for further processing (step 515) and transmitted to the client device (step 520). Again, the response is sent to the client device directly or via another cache server.

Next, if auxiliary resources pushed in connection with the response to this request are received by the cache server (step 525), they are stored for further processing (step 530) and sent to the client device (step 535).

After the auxiliary resources are sent to the client device or in parallel, the cache server reorganizes its cache memory according to the stored data.

If the response of the application server contains a 'Push-Policy' header (PP), it is advantageously stored since it may be of interest for the cache server even if there is no pushed resource (steps 525 and 555). This allows the cache server to replay the scenario associated with the request of the considered resource, knowing that there is no resource to push in the context of this request.

If resources have been pushed in connection with the request for the main resource, a link is created in the cache memory between the main resource entry and each pushed resource entry (step 540). As described above, these links make it possible to retrieve all resources pushed when requesting a given main resource.

As set forth above, a set of information is associated with these links (steps 545 and 550). This set comprises, in particular, the push policy contained in the 'Push-Policy' header of the response to the request (this push policy being associated with each link) as well as any additional information such as push policy parameters.

It is to be noted that several push policies may trigger the pushing of the same resource based on the same main resource. This can be handled either as separate links or a single link containing a list of different push policies.

As described in reference to FIG. 14, some pushed resources may be identified as potentially pushed for a large set of requested resources, such as all stored resources or all HTML web sites of a given server. In such a case, the cache server may create links between all main resources and the pushed resource. The cache server may also store these specific resources and check each request targeting the same server against these resources to check whether these resources might be pushed.

At the end of the algorithm illustrated in FIG. 5, the cache server has a set of cached entries, as available in existing standard cache proxies, augmented with push-policy links that can be used to replay push strategies for future requests. The push-policy links may be ordered to match the order used by the application server to push the resources. This order may be important. For example, pushed resource A may have a link to one or several other pushed resources such as pushed resources B and C. Accordingly, it may be advantageous to push resource A before resources B and C.

In general, the pushed entries are always cacheable and thus are valid cache entries as currently stored by cache servers. Some pushed entries may not be cacheable but may still be pushed for some time, based on a push policy validity parameter for instance. In such a case, a direct GET request to the pushed entry may not be answerable by the cache server directly but the cache server may still push this entry.

Figure 6:
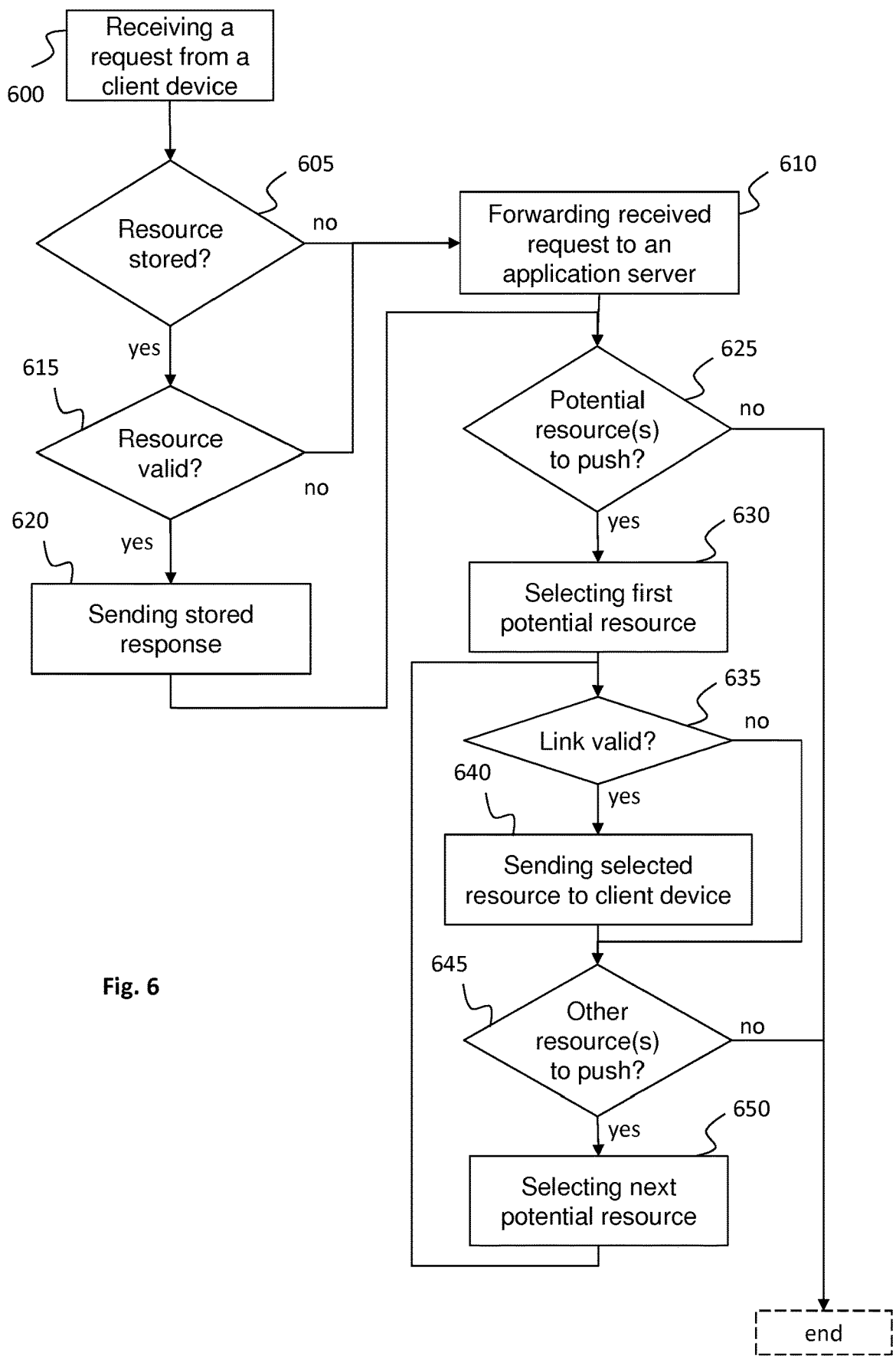
FIG. 6 illustrates an example of steps of an algorithm that can be implemented in a cache server for pushing cached resources in response to a request from a client device.

FIG. 6 illustrates an example of steps of an algorithm that can be implemented in a cache server for pushing cached resources in response to a request from a client device.

An algorithm like the one illustrated in FIG. 6 is typically used once the cache memory of the cache server comprises cache entries containing knowledge about push policies.

As illustrated, a first step is directed to receiving a request from a client device (step 600), directly or via another cache server.

Next, it is determined whether or not the requested resource is stored within the cache memory of the cache server (step 605). If the requested resource is not stored in the cache memory of the cache server, the request is forwarded to the application server (step 610), directly or via another cache server. This request is then processed as described by reference to FIG. 5.

On the contrary, if the requested resource is stored in the cache memory of the cache server, a test is performed to determine whether or not the stored requested resource is valid (step 615). If it is not valid, the request is forwarded to the application server (step 610) to be processed as described by reference to FIG. 5.

On the contrary, if the requested resource is stored in the cache memory of the cache server and is valid, it is obtained from the cache memory and sent back to the client device (step 620).

Whether or not the requested resource is stored in the cache memory of the cache server, the latter checks whether or not it can push resources in connection with the received request.

It is to be noted that if the required resource is stored within the cache memory of the cache server and is valid, the cache server may actually identify the resources to push before sending the response so that there are no race conditions between the client device requesting a resource and the client device receiving PUSH_PROMISES frames for the same resource.

If there is no valid response, the cache server may push resources despite the application server response not yet having been received. This makes it possible to use the time needed for obtaining the response from the application server to send information to the client device.

As described previously, the resources to push that are stored in the cache memory of the cache server are selected based on the received request and pushed.

To that end, it is determined whether or not there are potential resources to push (step 625). If there is no potential resource to push, the process ends.

On the contrary, if there is at least one potential resource to push, a first potential resource to push is selected (step 630) and the validity of the associated link is checked (step 635). If it is valid, the selected potential resource to push is pushed (step 640).

If the link is not valid or after having pushed the resource if it is valid, it is determined whether or not it remains at least one potential resource to push that has not been processed (step 645).

If all the potential resources to push have been processed, the process ends.

On the contrary, if it remains at least one potential resource to push that has not been processed, one remaining potential resource to push is selected and the last three steps (steps 635 to 645) are repeated.

According to a particular embodiment, checking the validity of a link may consist of a binary comparison of the 'Push-Policy' header associated with the link (i.e., the 'Push-Policy' header of the response received from the application server for the same resource request) with the 'Accept-Push-Policy' header of the received request. If the two values perfectly match, the link is considered as valid and the resource can be pushed (step 635). This is done for each potential resource to push in this list.

It is to be noted that the validity check may be limited to portion of the 'Push-Policy' and 'Accept-Push-Policy' headers or take into account parameters of the 'Push-Policy' header value. For example, as described in reference to FIGS. 9a and 9b, the 'Push-Policy' header may contain a 'default' parameter which allows the cache server to be instructed that a resource should be pushed if the client has not defined any 'Accept-Push-Policy' header.

The process ends when all potential pushed resources have been processed.

The cache server may decide to start pushing resources as soon as at least one resource to push has been selected (i.e., it belongs to the list of potential resources to push and it is valid). It may also decide to push the resources after processing each of the potential resources to push. This may be useful to order properly the sending of the pushed resources.

Figure 7:
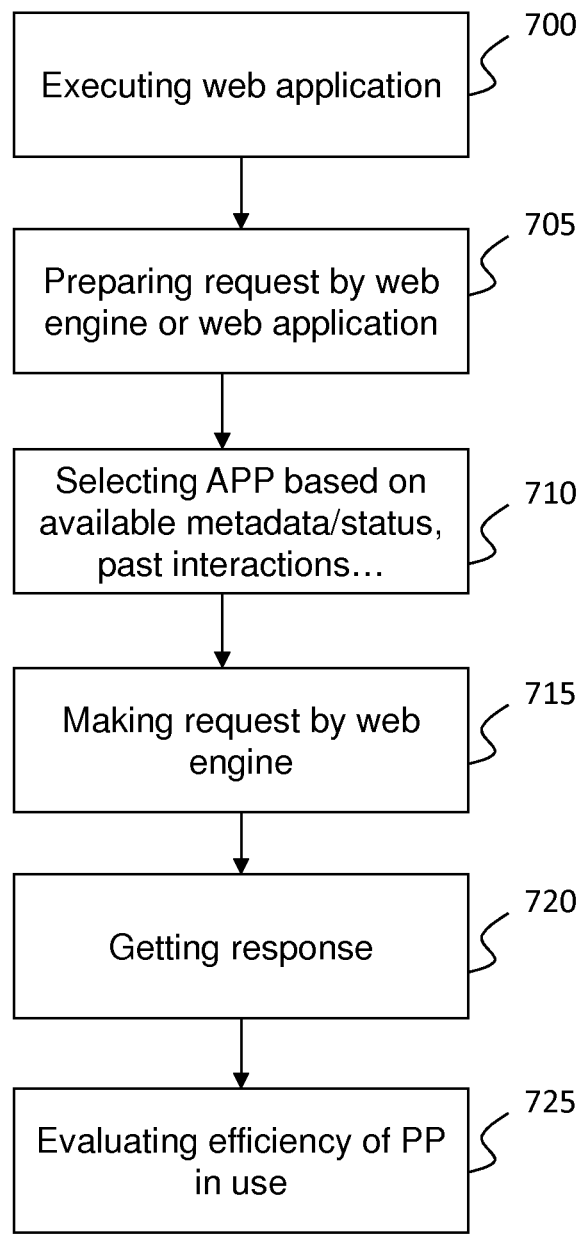
FIG. 7 illustrates an example of an algorithm that may be implemented in a client device to send requests containing 'Accept-Push-Policy' headers.

FIG. 7 illustrates an example of an algorithm that may be implemented in a client device to send requests containing 'Accept-Push-Policy' headers.

This algorithm is particularly adapted to the context of a web execution engine where some requests may be created either by a web application 'JavaScript code' or by the engine itself, for example when parsing documents.

As illustrated, a first step is directed to executing the web application (step 700). This execution may start with retrieving an HTML document that is parsed by the engine. This HTML document may contain links to other resources, such as scripts, CSS or media (e.g. images or videos).

For the sake of illustration, the following example presents an HTML document containing a video element with an 'src' attribute pointing to a resource. The preload attribute is set to 'metadata' which allows the browser to be informed that it should prefetch the video metadata and possibly the beginning of the video. If the video 'src' attribute refers to an MPD (as in the context of DASH video streaming), setting the 'Accept-Push-Policy' header to 'fast-start' may be useful so that the application server (or a cache server having the video content in cache memory) is instructed to try pushing the video content as soon as possible.

```
<html>
<body>
<video src="http://example.org/myvideo" preload="metadata">
</body>
...
</html>
```

Still for the sake of illustration, the following example is an HTML document containing a meta element which could instruct a web engine to use a specific 'Accept-Push-Policy' header value for any request made in the context of this HTML document. This would happen for example when retrieving the content of the script element using its 'src' attribute.

```
<html>
...
<meta name="Accept-Push-Policy" value="push-css">
<body>
<script src="http://example.org/myscript" ></script>
</body>
...
</html>
```

In these contexts, the request is created by the web engine (step 705) and the 'Accept-Push-Policy' is set to a value based on the available metadata or the status of the web engine (step 710). The web engine may also have stored information on the application server and may know that some push policies are in use by this server. In this case, the web engine may decide to reuse one of these policies if it has been found to be efficient by the web engine in the past. On the contrary, the web engine may set the 'Accept-Push-Policy' header value to 'None' if past interactions showed that the push policies used by the application server were not efficient for the case of the web application.

The following example presents a HTML document in which a request is defined by the JavaScript code and the script actually specifies the 'Accept-Push-Policy' header to use. This makes it possible to determine appropriately the 'Accept-Push-Policy' header value (i.e. this is an application specific decision). Once the request has been defined by the web application, the web engine translates this request into a specific HTTP request that is sent to the application server through the network (via a cache server).

```
<html>
<body>
<script>
function loadMyVideo(url){
    var req = new XMLHttpRequest( );
    req.setRequestHeader("Accept-Push-Policy", "fast-start");
    req.open('GET', 'http://example.org/myVideo')
    req.send( );
    ...
}
</script>
</body>
...
</html>
```

Once the request is prepared with the 'Accept-Push-Policy' header set appropriately, the web engine sends the request (step 715) and gets a response from the application server or a cache server (step 720). Once it has received a response and pushed resources, the web engine and/or the web application may evaluate the efficiency of the push policy (step 725). This efficiency may be measured by the client based on the number of pushed resources actually used by the client device after some time. It may also be based on the number of pushed resources that the client device already had in its cache. These different statistics may lead the web application or web engine to set the 'Accept-Push-Policy' header to a different value. This value may be application specific or generic in the case of 'None'.

For the sake of illustration, FIGS. 8 to 17 illustrate different scenarios wherein HTTP headers are used to convey push policy information. However, it is to be noted that there exist other ways for conveying the same information (as a header sub-part, within the body, within the URL of the request, and the like). It is also possible to convey this information outside the current messages, for example by using an additional HTTP/2 frame or by using a settable parameter in the HTTP/2 connection.

Figure 8B:
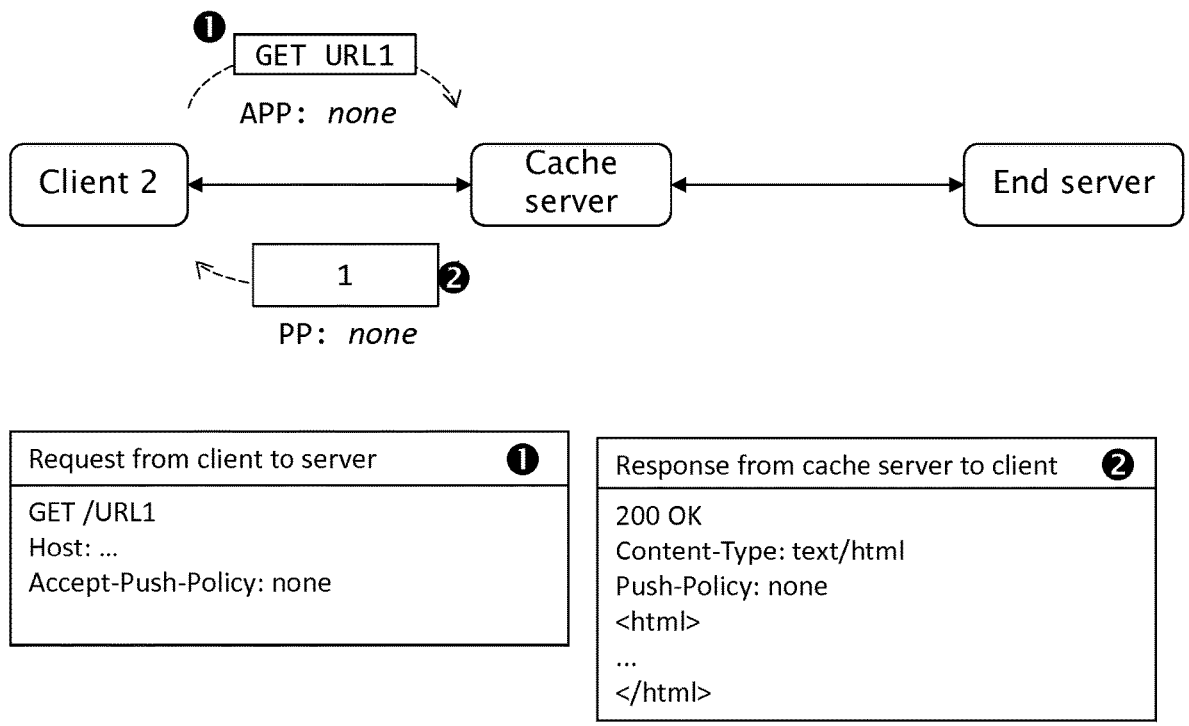

FIG. 8, comprising FIGS. 8a, 8b, and 8c, illustrates the scenario described by reference to FIG. 3 with more details regarding the request, the response to the request, and the pushed resources for which details of the HTTP headers are given.

FIG. 8a illustrates a simple scenario for accessing a web page.

As illustrated, the client device denoted 'client 1' sends a request to the cache server to obtain the resource denoted URL1. The client device has set the 'Accept-Push-Policy' header to the value 'subresources' to indicate that it agrees to receive resources that would be pushed.

Since the response to this request is not cached, the request is forwarded to the application server.

Based on the received 'Accept-Push-Policy' header set to 'subresources', the application server uses the push policy 'subresources' to identify the resources to push (i.e., resources URL2 and URL3).

Accordingly, the application server sends back the response of URL1, mainly consisting of an HTML document. In addition the application server is pushing the two sub-resources of URL1, that is to say the resources URL2 (CSS) and URL3 (JS).

When receiving the response and the pushed resources, the cache server stores URL1, URL2, and URL3 in its cache. Moreover, links are created from URL1 to URL2 and from URL1 to URL3. These links contain, in particular, a reference to the push policy used, i.e. 'subresources' as illustrated in the HTTP headers.

FIG. 8b illustrates another scenario for accessing the same web page as the one accessed in the scenario illustrated in FIG. 8a, after this page has been accessed by a first client device, i.e., when the requested resources are stored in the cache memory of the cache server. However, in this case, the client device has decided to not accept pushed auxiliary resources (e.g., the client is doing some proactive fetching and does not want to receive any related sub-resource).

As illustrated, the client device denoted 'client 2' sends a request to the cache server to obtain the resource denoted URL1. The client device has set the 'Accept-Push-Policy' header to the value 'None' to indicate that it does not agree to receive pushed resources.

Since the response to this request is cached, it does not forward it to the application server.

Based on the received 'Accept-Push-Policy' header set to 'None', the application server uses the push policy 'None' to determine that no resource is to be pushed.

In response, the cache server sends back the stored resource for URL1. If the cache server implements the semantics of 'None', the cache server stops there and does not push any related resource (as illustrated). On the contrary, if the cache server does not implement the semantics of 'None', the cache server tries to validate each link. Since the 'Accept-Push-Policy' header value of the current request (i.e., 'None') is not equal to the 'Push-Policy' header value of each link (i.e., 'subresources'), no link is validated and thus, no resource is actually pushed.

FIG. 8c illustrates another scenario for accessing the same web page as the one accessed in the scenario illustrated in FIG. 8a, after this page has been accessed by a first client device, i.e., when the requested resources are stored in the cache memory of the cache server. According to this example, the client device has decided to accept auxiliary resources that would be pushed (e.g., the client is doing some regular browsing).

As illustrated, the client device denoted 'client 3' sends a request to the cache server to obtain the resource URL1 with the 'Accept-Push-Policy' header set to 'subresources' so as to indicate that the client device agrees to receive pushed auxiliary resources.

Since the response is available in the cache server, the cache server returns the data corresponding to URL1. The cache server then checks each link of the stored resources. It uses the request 'Accept-Push-Policy' header value to perform a binary comparison with the 'Push-Policy' stored within each link. Since both URL2 and URL3 links match the 'subresources' policy, the cache server pushes URL2 and URL3, thus replicating what the end server did for Client 1.

FIG. 9, comprising FIGS. 9a to 9d, illustrates a scenario in which a default push policy is used when a user device does not define any 'Accept-Push-Policy' header. It is close to the scenario described by reference to FIG. 8.

Figure 9A:
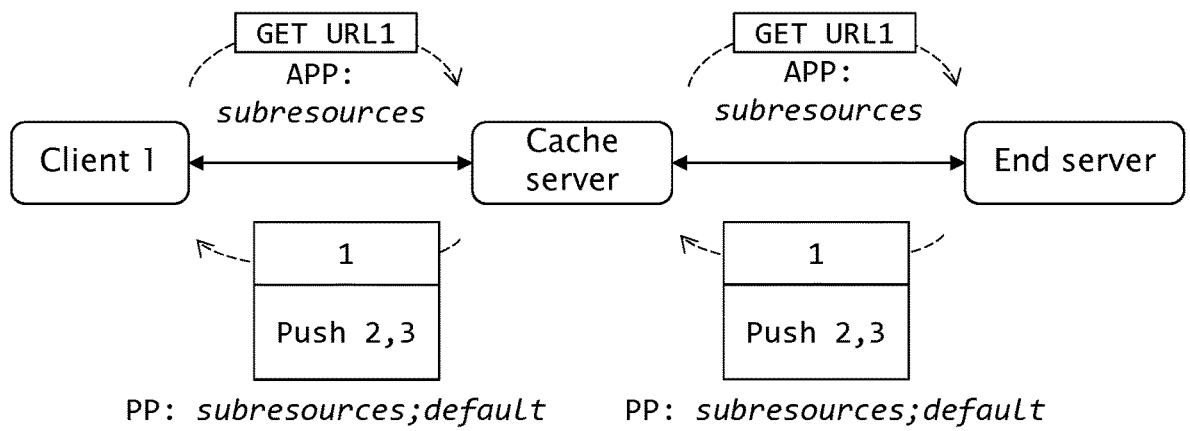
FIGS. 9a to 9d, illustrate a scenario in which a default push policy is applied when a user device does not define any 'Accept-Push-Policy' header.

As illustrated in FIG. 9a, the client device denoted 'client 1' sends a request to the cache server to obtain the resource denoted URL1. The client device has set the 'Accept-Push-Policy' header to the value 'subresources' to indicate that it agrees to receive pushed resources.

Since the response to this request is not cached, the request is forwarded to the application server.

Based on the received 'Accept-Push-Policy' header set to 'subresources', the application server uses the push policy 'subresources' to identify the resources to push (i.e., resources URL2 and URL3). Moreover, the application server determines that these resources should be pushed by default (i.e. although a client device does not indicate that it agrees to receive pushed resources).

Accordingly, the application server sends back the response of URL1, mainly consisting of an HTML document. In addition the application server pushes the two sub-resources of URL1, that is to say the resources URL2 (CSS) and URL3 (JS).

As illustrated, the end server has set the 'Push-Policy' header of the response to the value 'subresources;default' to indicate that the pushed resources associated with this response should be pushed in the case according to which the 'Accept-Push-Policy' header of a request for resource URL1 is set to 'subresources' and according to which there is no 'Accept-Push-Policy' header that is defined in the request for resource URL1.

When receiving the response and the pushed resources, the cache server stores URL1, URL2, and URL3 in its cache. Moreover, links are created from URL1 to URL2 and from URL1 to URL3. These links contain, in particular, a reference to the used push policy, i.e. 'subresources;default'.

Figure 9B:
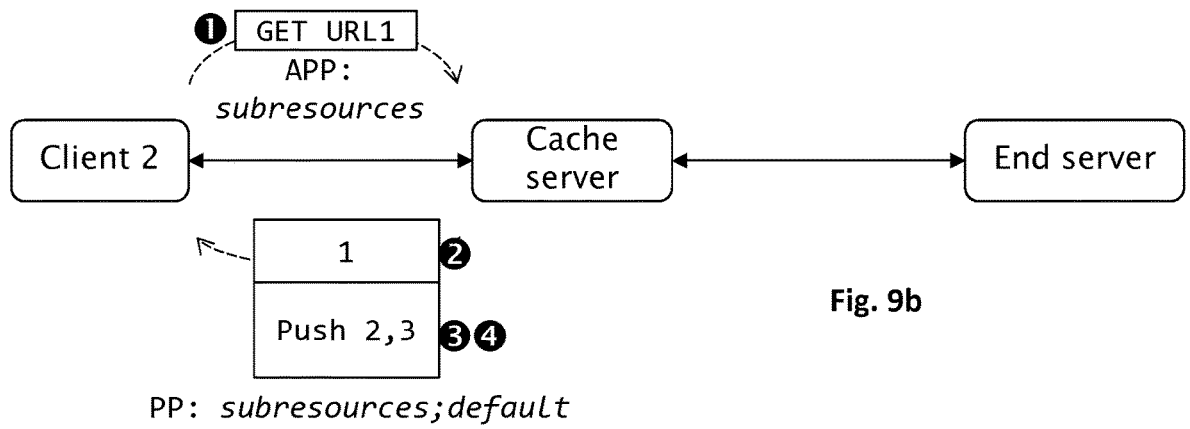

Then, as illustrated in FIG. 9b, when another client device, denoted 'Client 2', is sending a request for resource URL1 without any 'Accept-Push-Policy' header, the cache server returns resource URL1 and checks each link. Since each link can be activated by default and since the request for resource URL1 does not contain any 'Accept-Push-Policy' header, each link is considered to be valid and thus, the cache server pushes resources URL2 and URL3 in addition to sending back resource URL1.

As can be seen in FIG. 9b, the main push policy information is defined in the response to the request, i.e. in the response associated with the requested resource.

'Push-Policy' headers may also be associated to the pushed resources to refine or replace the information of the 'Push-Policy' header comprised within the response to the request. It may even happen that the main resource does not have any 'Push-Policy' header but only the pushed resources have one.

In the example given in FIG. 9b, the first pushed resources (whose URL is '/URL2') defines a 'Push-Policy' header that is set to 'subresources, render'. This means that this resource may be pushed if the client device accepts a push policy of the 'subresources' or 'render' type. On the contrary, the second pushed resource has no push policy header and uses the default information associated with the response to the request (i.e., associated with the main resource). In such a case, the second pushed resource would not be pushed if a device client sets an 'Accept-Push-Policy' header to 'render', contrary to the first pushed resource.

Figure 9C:
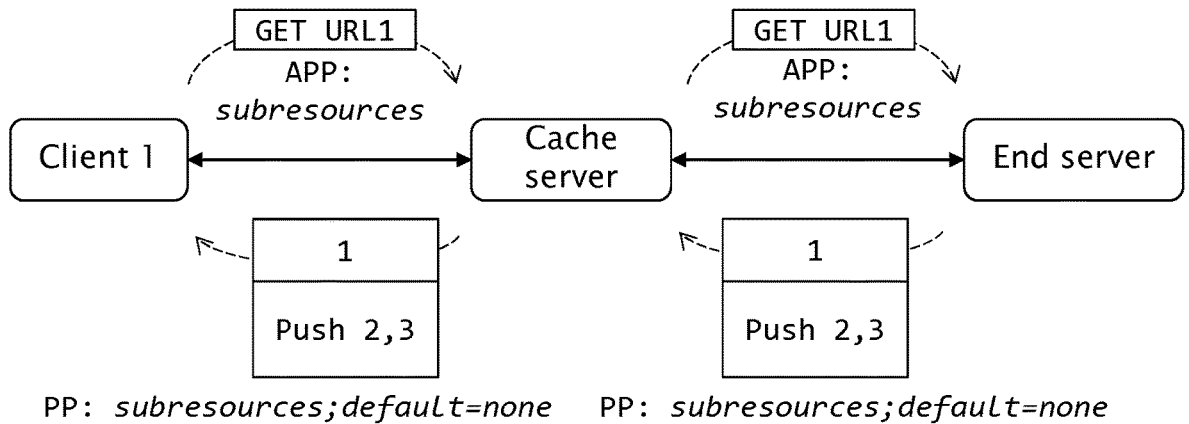
Figure 9D:
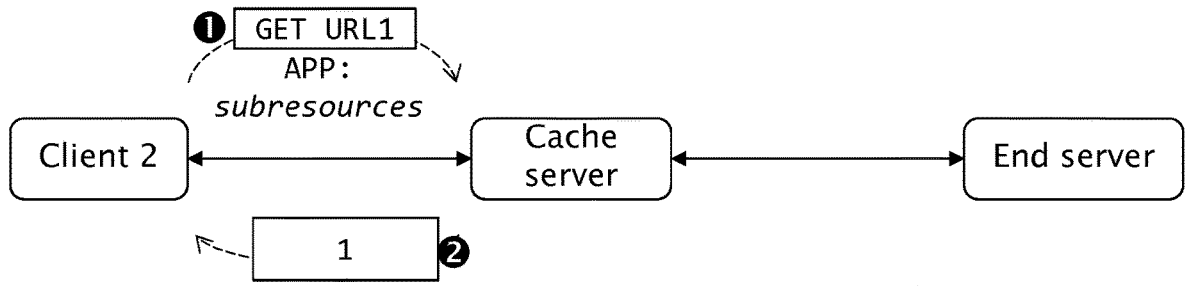

In the context of FIGS. 9c and 9d, it is stated that no resource should be pushed by default.

As illustrated in FIG. 9c, the client device denoted 'client 1' sends a request to the cache server to obtain the resource denoted URL1. The client device has set the 'Accept-Push-Policy' header to the value 'subresources' to indicate that it agrees to receive resources that would be pushed.

Since the response to this request is not cached, the request is forwarded to the application server.

Based on the received 'Accept-Push-Policy' header set to 'subresources', the application server uses the push policy 'subresources' to identify the resources to push (i.e., resources URL2 and URL3). Moreover, the application server determines that these resources should not be pushed by default (i.e. although a client device does not indicate that it does not agree to receive push resources).

Accordingly, the application server sends back the response of URL1, mainly consisting of a HTML document. In addition the application server is pushing the two sub-resources of URL1, that is to say the resources URL2 (CSS) and URL3 (JS).

As illustrated, the end server has set the 'Push-Policy' header of the response to the value 'subresources; default=none' to indicate that the pushed resources associated with this response should be pushed in the case in which the 'Accept-Push-Policy' header of a request for resource URL1 is set to 'subresources' and should not be pushed in the case in which there is no 'Accept-Push-Policy' header that is defined in the request for resource URL1.

When receiving the response and the pushed resources, the cache server stores URL1, URL2, and URL3 in its cache. Moreover, links are created from URL1 to URL2 and from URL1 to URL3. These links contain, in particular, a reference to the used push policy, i.e. 'subresources; default=none'.

Then, as illustrated in FIG. 9d, when another client device, denoted 'Client 3', is sending a request for resource URL1 that does not comprise any 'Accept-Push-Policy' header, the cache server sends back resource URL1 but it does not push any resource.

Figure 10A:
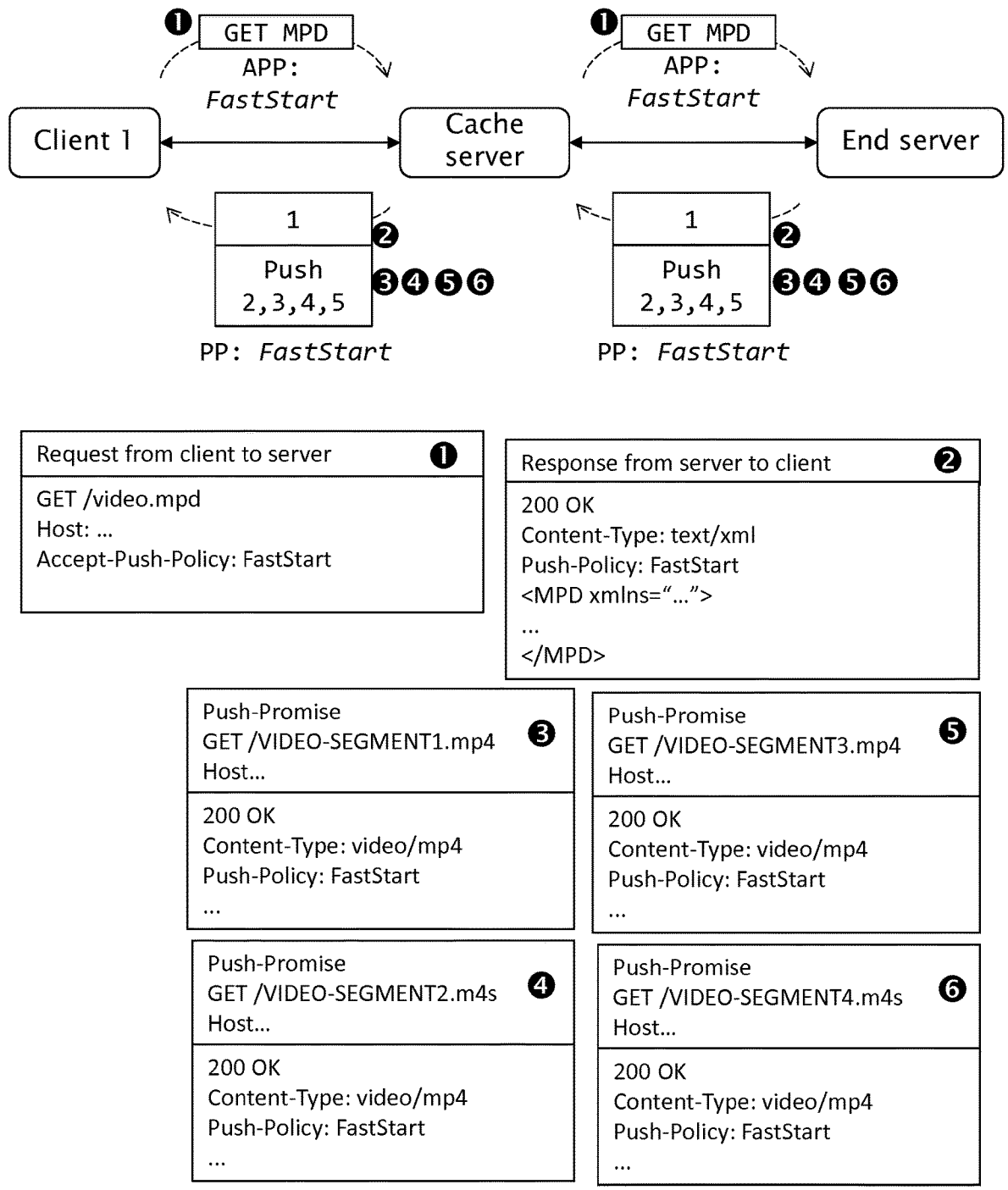
Figure 10B:
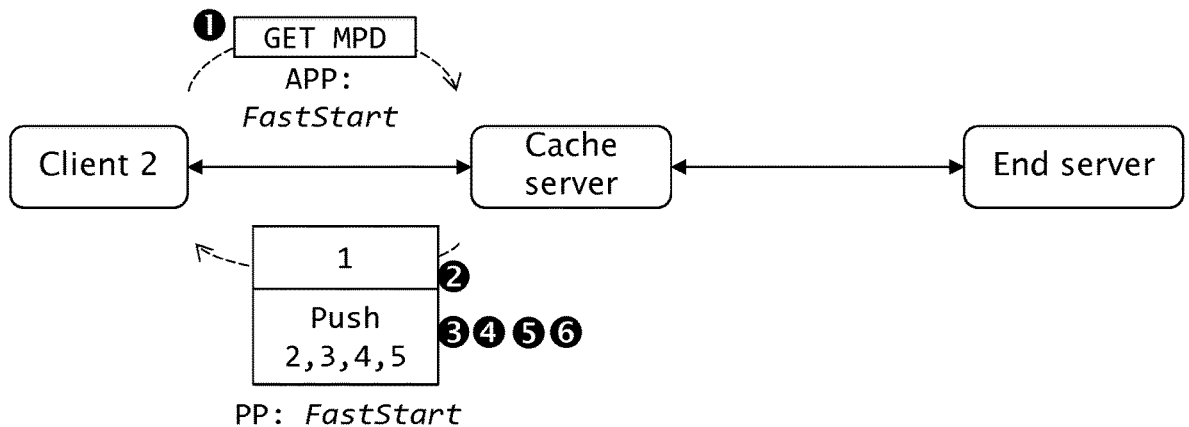
Figure 10B:
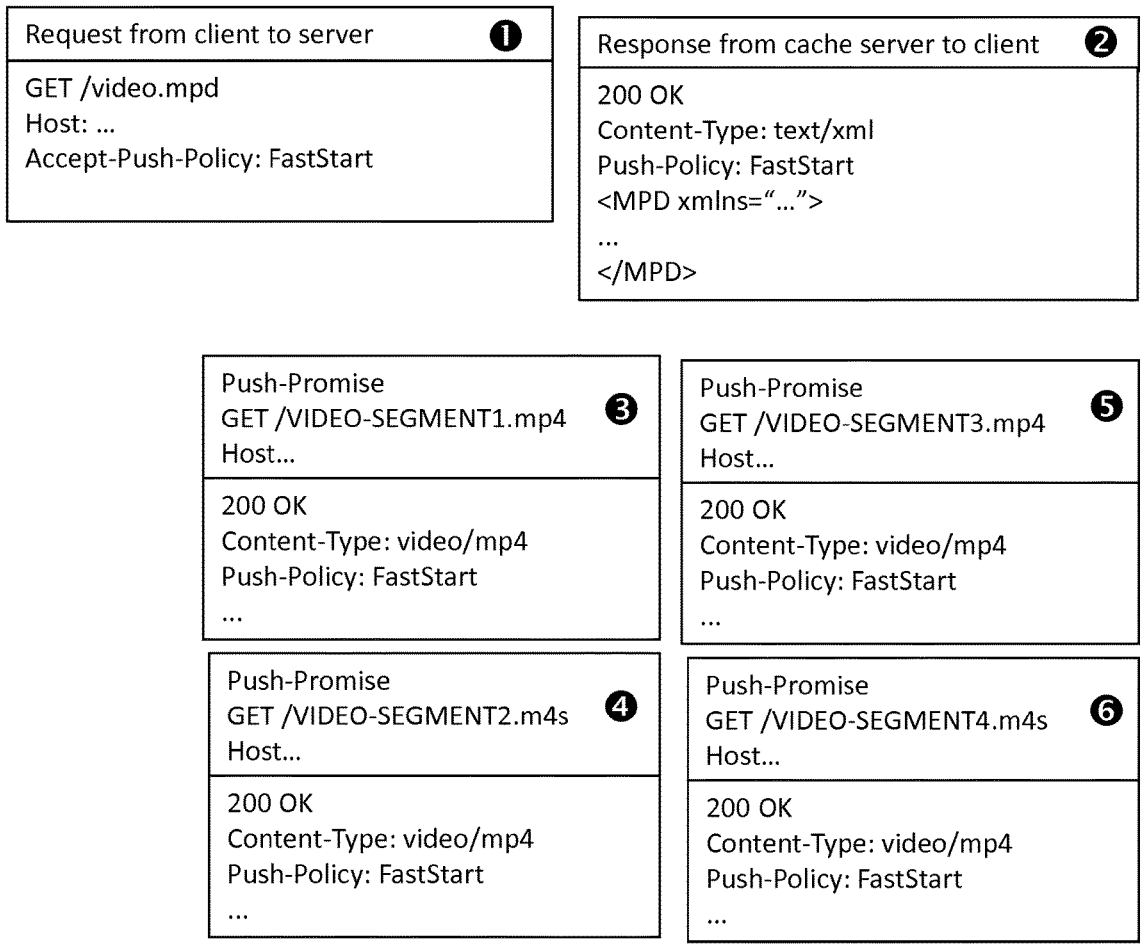

FIG. 10, comprising FIGS. 10a, 10b, and 10c, illustrates a scenario for replaying a push strategy in a cache server in the context of DASH video streaming.

As illustrated in FIG. 10a, the client device denoted 'client 1', typically a web application using XMLHttpRequest, sends a request to the cache server to obtain the resource denoted MPD that contains links to video segment data. In such a case, the web application sets the 'Accept-Push-Policy' header to the value 'FastStart' to make it possible to play videos as soon as possible (i.e., to indicate that it agrees to receive resources that would be pushed).

Since the response to this request is not cached, the request is forwarded to the application server.

Based on the received 'Accept-Push-Policy' header set to 'FastStart', the application server uses the push policy 'FastStart' to identify the resources to push (i.e., video segments VIDEO-SEGMENT1 to VIDEO-SEGMENT4).

Accordingly, the application server sends back the response to the request, comprising the requested MPD. In addition the application server is pushing the four sub-resources of the MPD, that is to say the resources VIDEO-SEGMENT1 to VIDEO-SEGMENT4.

As illustrated, the end server has set the 'Push-Policy' header of the response to the value 'FastStart' to indicate that the pushed resources associated with this response should be pushed in the case in which the 'Accept-Push-Policy' header of a request for resource MPD is set to 'FastStart'.

When receiving the response and the pushed resources, the cache server stores MPD and videos VIDEO-SEGMENT1 to VIDEO-SEGMENT4 in its cache. Moreover, links are created from MPD to VIDEO-SEGMENT1, from MPD to VIDEO-SEGMENT2, from MPD to VIDEO-SEGMENT3, from MPD to VIDEO-SEGMENT4. These links contain, in particular, a reference to the used push policy, i.e. 'FastStart'.

Then, as illustrated in FIG. 10b, when another client device, denoted 'Client 2', is sending a request for resource MPD with the 'Accept-Push-Policy' set to 'FastStart', the cache server returns resource MPD and checks each link.

Since the 'Push-Policy' header associated with each link associated with cached resource MPD is set to 'FastStart' like the 'Accept-Push-Policy' header of the request, each link is considered to be valid and thus, the cache server pushes resources VIDEO-SEGMENT1 to VIDEO-SEGMENT4 in addition to sending back resource MPD.

Therefore, the cache server replays the end server push policy without any specific knowledge about the 'FastStart' push policy.

However, as illustrated in FIG. 10c, this approach has some limitations.

When a client device denoted 'Client 3' sends a request for the resource MPD while indicating in its 'Accept-Push-Policy' header the value 'FastStart;n=3' (in order to indicate that the client device is expected to receive some video segments, but no more than 3), the cache server determines (in a binary comparison) that the value of the 'Accept-Push-Policy' header of the request does not match the value of the 'Push-Policy' of the links. Therefore, the cache server does not push the cached videos.

Therefore, to handle such cases and according to particular embodiment, the cache server has specific behaviours associated with specific push policies. For the sake of illustration, the cache server may be upgraded so to know the meaning of the 'FastStart' push policy and more specifically of its parameter 'n'. In such a case, this enhanced cache server validates all links based on the push order of the end server. Accordingly, once three links are validated, the enhanced cache server stops validating links and transmits the MPD and three video segments. This example shows that the described 'Push-Policy' mechanism is operable with application-specific policies that are defined only in a web application and that it may be beneficial to define generic push policies that the cache server could use to further optimize its processing.

It is to be noted that it may be advantageous to limit the validity of the links in time. One potential use-case is a news web site. According to such an application, an application server may push some 'news' entries, these entries being pushed only for a limited period of time, a shorter time than their cache freshness.

Figure 11A:
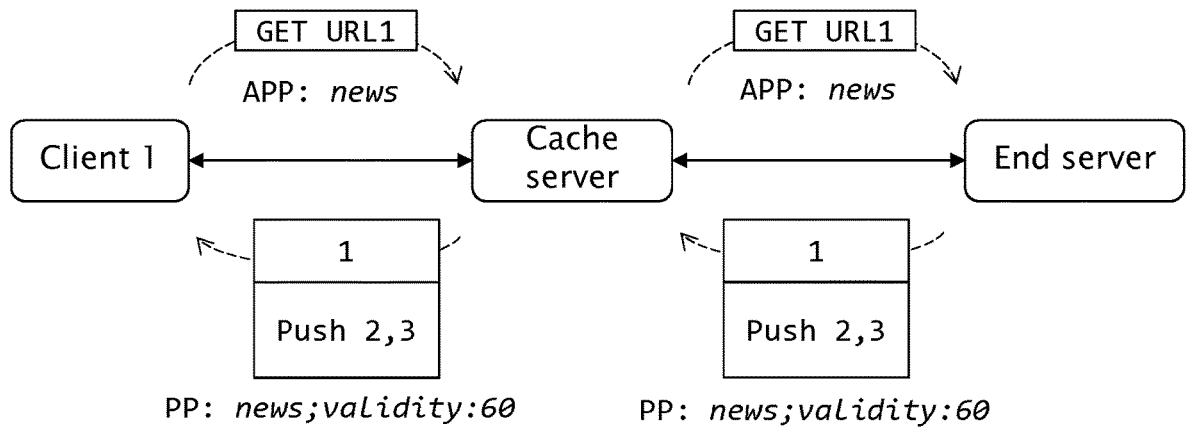
FIGS. 11a, 11b, and 11c, illustrate a scenario in which the validity period of links between a requested resource and pushed resources is controlled.
Figure 11B:
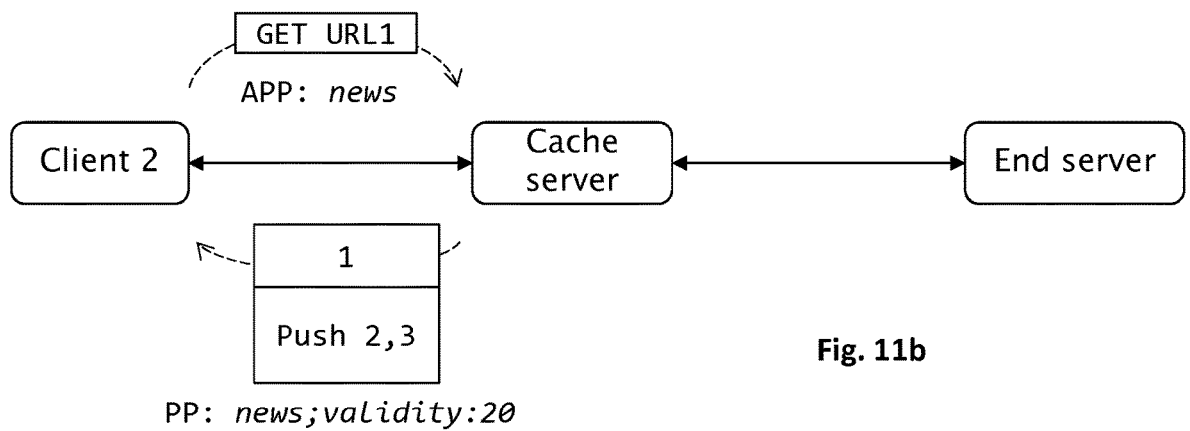
Figure 11C:
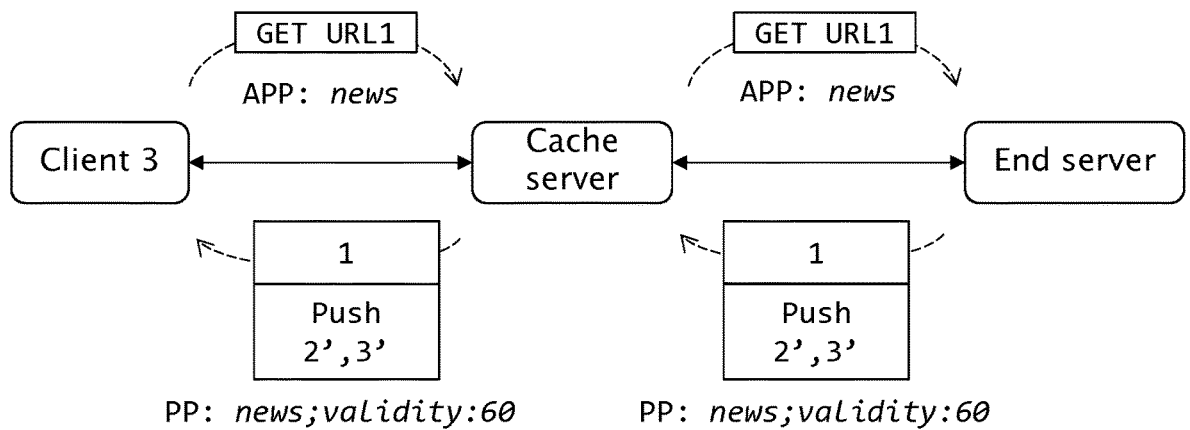

FIG. 11, comprising FIGS. 11a, 11b, and 11c, illustrates a scenario in which the validity period of links between a requested resource and pushed resources is controlled.

As illustrated in FIG. 11a, the client device denoted 'client 1' sends a request to the cache server to obtain the resource denoted URL1. The client device has set the 'Accept-Push-Policy' header to the value 'news' to indicate that it agrees to receive resources that would be pushed and that the pushed resources should be the freshest.

Since the response to this request is not cached, the request is forwarded to the application server.

Based on the received 'Accept-Push-Policy' header set to 'news', the application server uses the push policy 'news' to identify the resources to push (e.g., resources URL2 and URL3). Moreover, the application server determines the validity period that should be assigned to the identified resources to push.

Accordingly, the application server sends back the resource URL1. In addition the application server is pushing the two sub-resources of URL1, that is to say the resources URL2 and URL3.

As illustrated, the end server has set the 'Push-Policy' header of the response to the value 'news;validity:60' to indicate that the pushed resources associated with this response should be pushed in the case in which the 'Accept-Push-Policy' header of a request for resource URL1 is set to 'news', if a new request for resource URL1 is received in the validity period of 60 seconds after receiving the pushed data from the application server. It is to be noted that the '60' parameter can be set in the header itself (as illustrated) or in a separate 'Push-Policy-Validity' header (not represented).

When receiving the response and the pushed resources, the cache server stores URL1, URL2, and URL3 in its cache. Moreover, links are created from URL1 to URL2 and from URL1 to URL3. These links contain, in particular, a reference to the used push policy and its parameters, i.e. 'news; validity:60'.

Then, as illustrated in FIG. 11b, when another client device, denoted 'Client 2', is sending a request for resource URL1 comprising an 'Accept-Push-Policy' header set to 'news', the cache server returns resource URL1 and checks each link.

Since each link comprises a validity period, the cache server determine the time delay between the reception of the cached response and the reception of the new request for the cached response, which is assumed to be 40 seconds. Since 40 seconds is less than the validity period of 60 seconds sets in the 'Push-Policy' header associated with the links, each link is considered to be valid and thus, the cache server pushes resources URL2 and URL3 in addition to sending back resource URL1. It is to be noted that the validity period indicated within the 'Push-Policy' header is adjusted as a function of the time of reception of the resources to push and of the reception of the new request (i.e. 20=60-40).

This makes it possible to reduce the latency and saves processing time on the end server end.

Then, as illustrated in FIG. 11c, when another client device, denoted 'Client 3', is sending a request for resource URL1 comprising an 'Accept-Push-Policy' header set to 'news', the cache server returns resource URL1 and checks each link.

Again, since each link comprises a validity period, the cache server determine the time delay between the reception of the cached response and the reception of the new request for the cached response, which is assumed to be 90 seconds. Since 90 seconds is greater than the validity period of 60 seconds sets in the 'Push-Policy' header associated with the links, each link is not considered as being valid.

Accordingly, the request is forwarded to the application server that sends back the resource URL1 and pushes the two sub-resources of URL1, that is to say the latest version of resources URL2 and URL3 denoted 2' and 3' in FIG. 11c.

As illustrated, the end server has set the 'Push-Policy' header of the response to the value 'news;validity:60' as described above.

When receiving the response and the pushed resources, the cache server stores URL1, URL2, and URL3 in its cache. Moreover, links are created from URL1 to URL2 and from URL1 to URL3. These links contain, in particular, a reference to the used push policy and its parameters, i.e. 'news; validity:60'.

It is to be noted that the news entries in the cache memory of the cache server may remain valid for a longer period, it is only the links that get deprecated.

It has been observed that an application server may decide to push different resources according to parts of a request other than an URL and an 'Accept-Push-Policy' header. For the sake of illustration, an example is directed to the case of a web site that optimizes the images according the size of the client device screen.

Figure 12A:
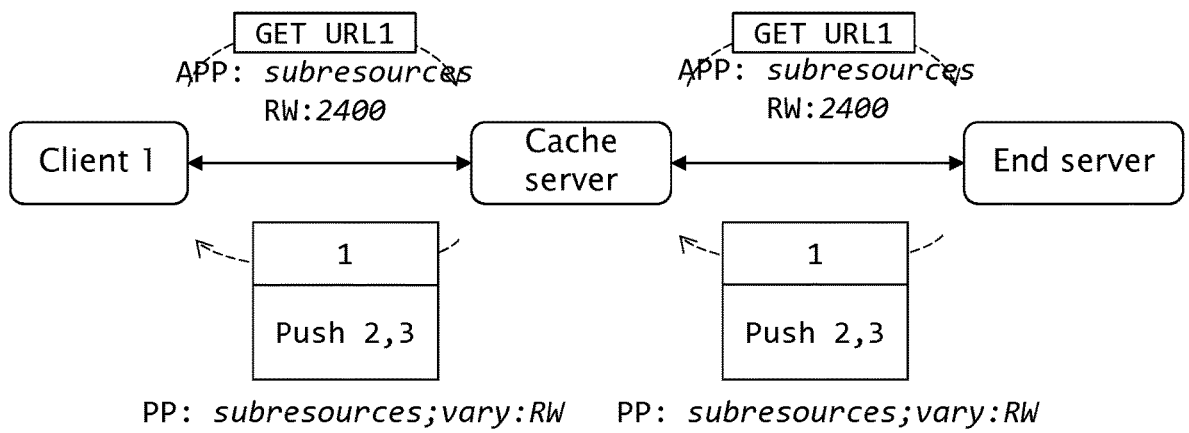
FIGS. 12a, 12b, and 12c, illustrate a scenario in which the pushed resources are identified as a function of information obtained from parts of a request different than an URL and an 'Accept-Push-Policy' headers.
Figure 12B:
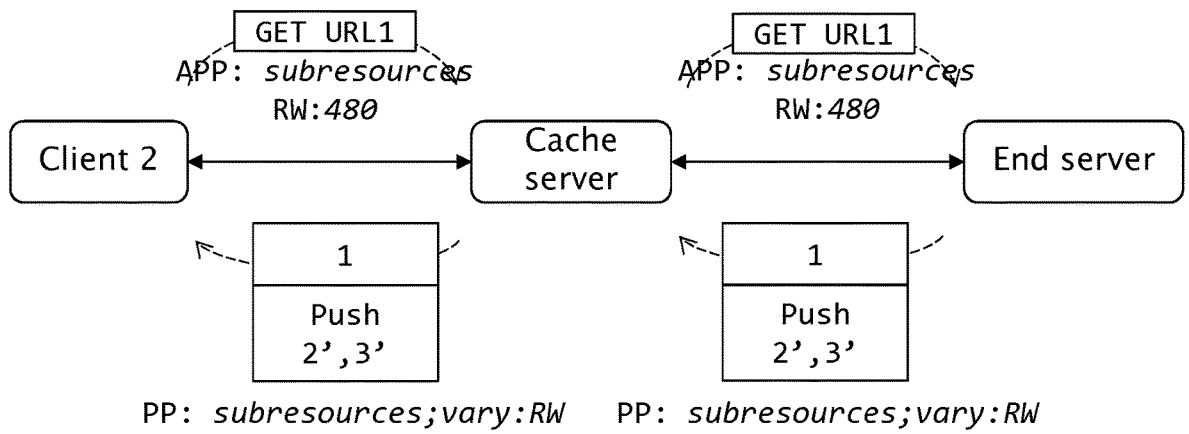
Figure 12C:
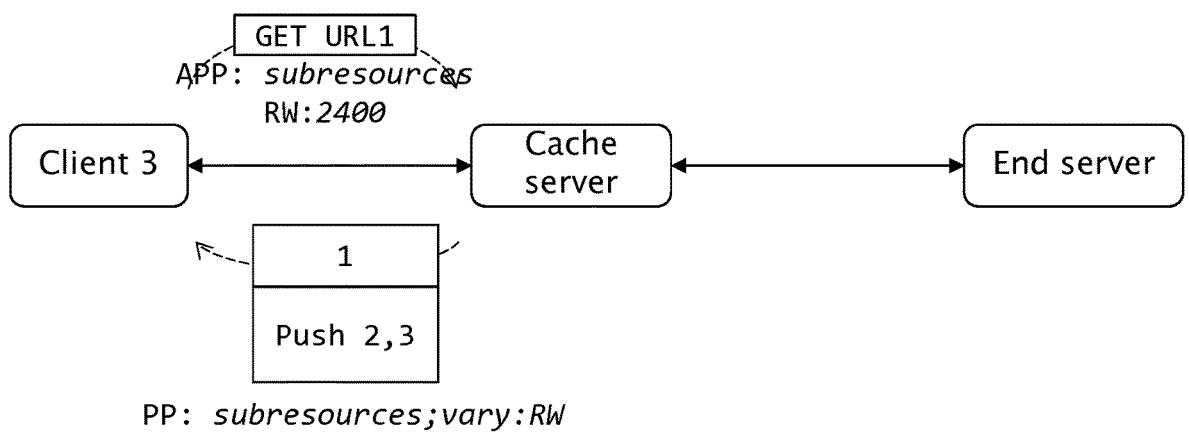

FIG. 12, comprising FIGS. 12a, 12b, and 12c, illustrates a scenario in which the pushed resources are identified as a function of information obtained from parts of a request different than an URL and an 'Accept-Push-Policy' headers.

In order to make it possible for a cache server to identify resources to be pushed, an application server may use a 'vary' parameter in a 'Push-Policy' header as illustrated in FIG. 12 or may use a 'Push-Policy-Vary'.

As illustrated in FIG. 12a, the client device denoted 'client 1' sends a request to the cache server to obtain the resource denoted URL1. The client device has set the 'Accept-Push-Policy' header to the value 'subresources;RW: 2400' to indicate that it agrees to receive resources ('subresources'). It has also indicated that the display for the resource is expected to be 2,400 pixel wide using the 'RW' header ('RW:2400'). The 'RW' header is under standardization within the IETF as a client hint (http://tools.ietf.org/html/draft-grigorik-http-client-hints).

Since the response to this request is not cached, the request is forwarded to the application server.

Based on the received 'Accept-Push-Policy' header set to 'subresources' and on the 'RW' header, the application server uses the push policy 'subresources' to identify the resources to push (e.g., the two high resolution images 2 and 3). The application server also states that the push policy is set to 'subresources' but may vary according the client device 'RW' header ('vary:RW').

Next, the application server sends back the resource URL1 and pushes the two sub-resources of URL1 (the high resolution images 2 and 3).

When receiving the response and the pushed resources, the cache server transmits them to the client device, stores them in its cache memory and creates links from URL1 to the high resolution image 2 and from URL1 to the high resolution image 3.

Then, when new client 'Client 2' illustrated in FIG. 12b is requesting the same document with a different resolution (the client device 'RW' header is set to 480 (pixels)), the cache server forwards the request to the application server (since the response is not cached within the cache server).

Based on the received 'Accept-Push-Policy' header set to 'subresources' and on the 'RW' header, the application server uses the push policy 'subresources' to identify the resources to push (e.g., the two low resolution images 2' and 3'). Again, the application server states that the push policy is set to 'subresources' and that it may vary according the client device 'RW' header ('vary:RW').

Next, the application server sends back the resource URL1 and pushed the two sub-resources of URL1 (the low resolution images 2' and 3').

When receiving the response and the pushed resources, the cache server transmits them to the client device, stores them in its cache memory and creates links from URL1 to the low resolution image 2' and from URL1 to the low resolution image 3'.

At this stage, the cache server stores the high resolution images 2 and 3 as well as the low resolution images 2' and 3'.

Therefore, when new client 'Client 3' illustrated in FIG. 12c is requesting the same document with one of the two resolutions (the client device 'RW' header is set to 2,400 (pixels)), the cache server can respond to the request by sending the requested resource and can select and push the resources that are associated with the requested resource and that correspond to the resolution of the requesting client device (i.e., the high resolution images 2 and 3).

To provide more refined validation logic, a similar mechanism to the "Key" header field could be used so that a range of values (for instance 1200 to 4800) is used to validate the links and not a single value. In such a case, the 'Push-Policy' header would have taken a value like 'subresources; Key: RW[1200:4800]'.

The application server may also decide to reuse existing 'Key' or 'Vary' header. Accordingly, a response to a main request may contain a 'Vary' or 'Key' header to disable the function of returning a resource stored in the cache server. In such a case, an option may be for the cache server to not push any resource for stored resources which do not match 'Vary' or 'Key' headers.

According to the previous example, a push policy applied for a given request may be replayed for different client devices requesting the same resource. However, there exist cases for which it may be advantageous to replay push strategies for other documents as well. For example, a web site may use the same scripts on several web pages.

Figure 13A:
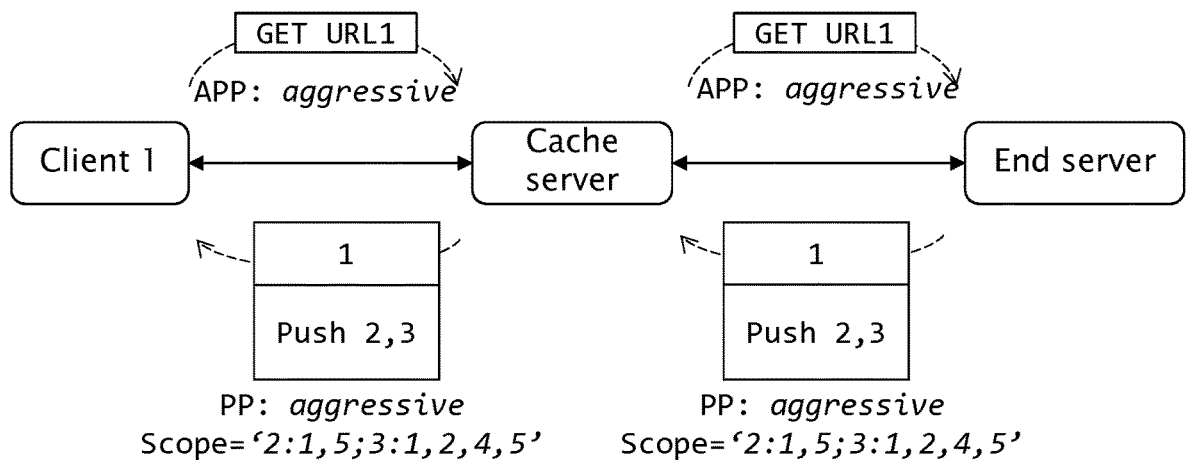
FIGS. 13a, 13b, and 13c, illustrate a scenario in which a cache server may apply a push strategy associated with a given resource to another requested resource.
Figure 13B:
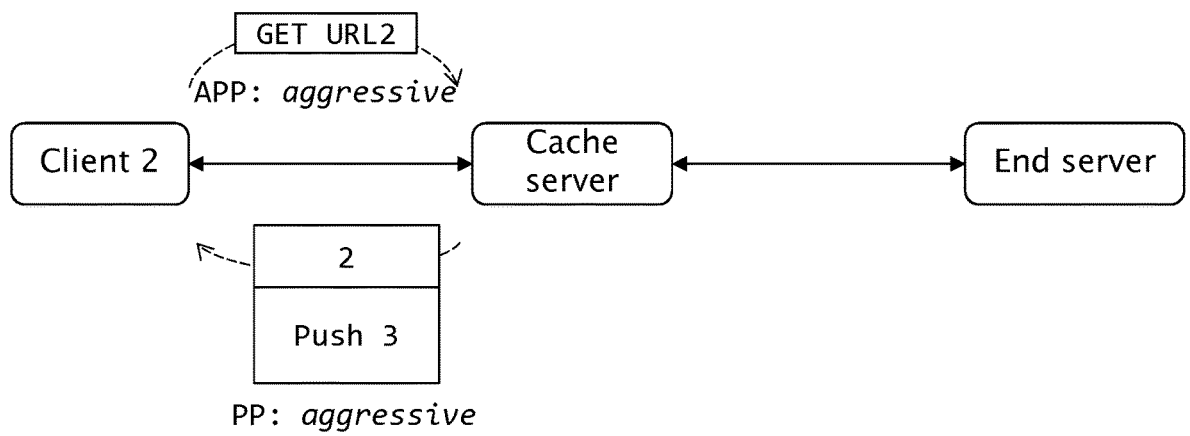
Figure 13C:
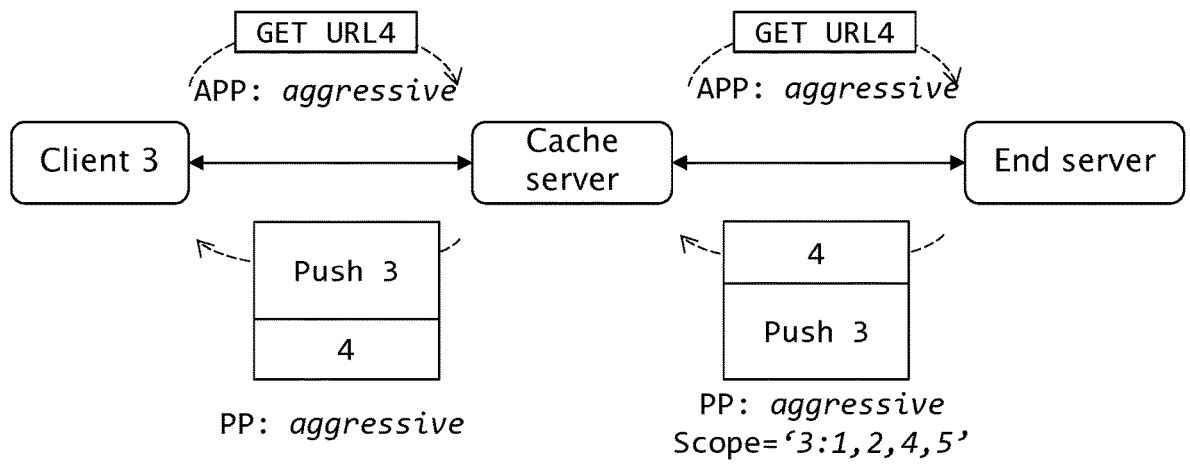

FIG. 13, comprising FIGS. 13a, 13b, and 13c, illustrates a scenario in which a cache server may apply a push strategy associated with a given resource to another requested resource.

According to the example illustrated in FIG. 13, an application server stores three main web pages (denoted 1, 4 and 5) with two sub-resources (denoted 2 and 3). According to this example, sub-resource 2 is used in conjunction with main resources 1 and 5 while sub-resource 3 is used with all the main resources (i.e. the resources 1, 4, and 5).

As illustrated in FIG. 13a, the client device denoted 'client 1' sends a request to the cache server to obtain the resource denoted URL1 (representing the web page 1) that contains links to sub-resources 2 and 3. The request contains the 'Accept-Push-Policy' header sets to the value 'aggressive'.

Since the response to this request is not cached, the request is forwarded to the application server.

Based on the received 'Accept-Push-Policy' header set to 'aggressive', the application server uses the push policy 'aggressive' to identify the resources to push (i.e., sub-resources 2 and 3). Accordingly, the application server sends back the response to the request, comprising the requested main resource 1 and sub-resources 2 and 3.

As illustrated, the application server sets the 'Push-policy' header to 'aggressive' and sets a 'scope' header to '2:1,5;3:1,2,4,5'. In conjunction with an 'Accept-Push-policy' header set 'aggressive', the value '2:1,5;3:1,2,4,5' means that the sub-resource 2 should be pushed when the resource 1 or the resource 5 is transmitted and that the sub-resource 3 should be pushed when one of the resources 1, 2, 4, and 5 is transmitted.

When receiving the response and the pushed resources, the cache server forwards them to the client device, stores them in its cache memory and creates links between the resource 1 and the sub-resource 2 and between the resource 1 and the sub-resource 3. These links contain, in particular, a reference to the used push policy, i.e. 'aggressive', and to the parameters used in conjunction with this push policy, i.e. 'scope=2:1,5;3:1,2,4,5'.

When new client 'Client 2' illustrated in FIG. 13b is requesting sub-resource 2, the cache server determines that it is already stored in its cache memory and transmits back this resource to the client device. In addition, the cache server identifies sub-resource 3 that is to be pushed in view of the information extracted from the scope parameter associated with resource 2 and sub-resource 3 in the cache memory. Accordingly, the cache server pushes sub-resource 3 to the client device.

When new client 'Client 3' illustrated in FIG. 13c is requesting sub-resource 4, the cache server determines that it is not already stored in its cache memory and thus, forwards the request to the application server. However, the cache server identifies sub-resource 3 that is to be pushed in view of the information extracted from the scope parameter associated with sub-resource 3 in the cache memory. Accordingly, the cache server pushes sub-resource 3 to the client device.

Then, the application server transmits the requested resource (i.e. resource 4) to the cache server which, in turn, transmits this resource to the client device.

This has the advantage that sub-resource 3 can be transmitted while resource 4 is requested, received and transmitted back to the client device by the cache server.

Figure 14A:
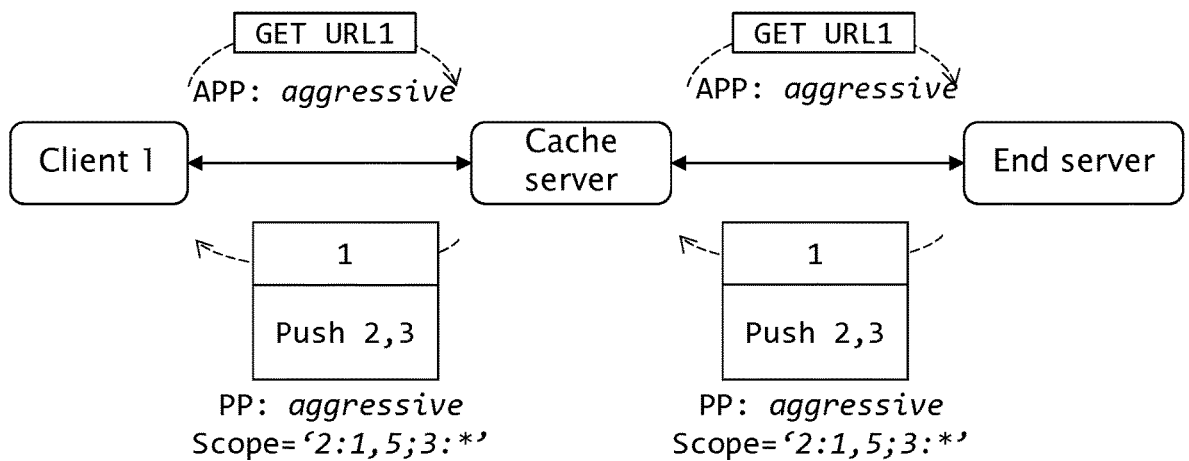
FIGS. 14a, 14b, and 14c, illustrate a second scenario in which a cache server may apply a push strategy associated with a given resource to another requested resource.
Figure 14B:
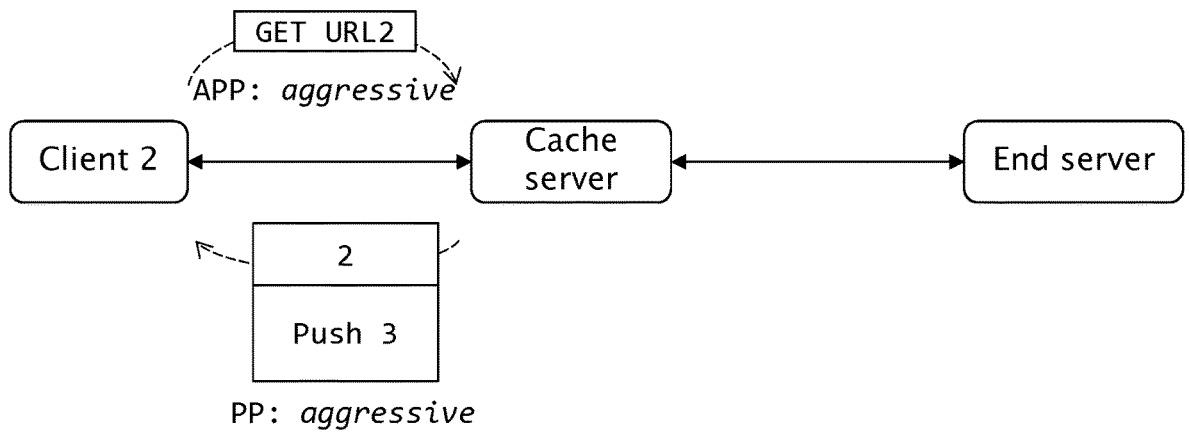
Figure 14C:
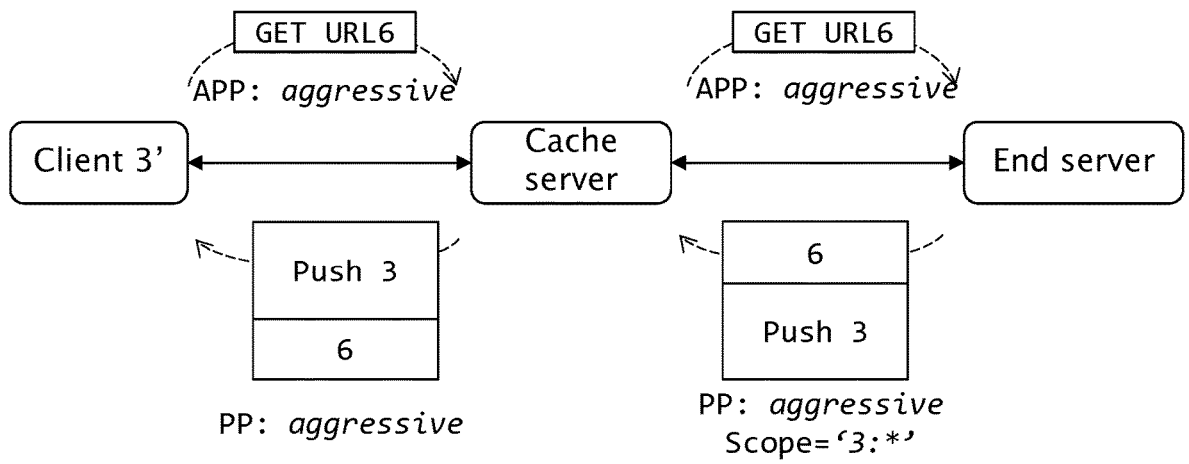

FIG. 14, comprising FIGS. 14a, 14b, and 14c, illustrates a second scenario in which a cache server may apply a push strategy associated with a given resource to another requested resource.

The example illustrated in FIG. 14 is similar to the one illustrated in FIG. 13 with the addition of a wildcard scope, meaning that some requests may be pushed for all resources or a subset of all resources (like all HTML files, all JavaScript, and the like).

The process related to 'Client 1' and 'Client 2' in FIG. 14 (i.e. FIGS. 14a and 14b) is similar to the process related to 'Client 1' and 'Client 2' in FIG. 13, the main exception being that the value of the 'scope' header for sub-resource 3 is set to '*' which means that all resources that are requested with an 'Accept-Push-Policy' header set to 'aggressive' will lead to push sub-resource 3.

When new client 'Client 3' illustrated in FIG. 14c is requesting sub-resource 6, the cache server determines that it is not already stored in its cache memory and thus, forwards the request to the application server. However, the cache server identifies sub-resource 3 that is to be pushed in view of the information extracted from the scope parameter associated with sub-resource 3 in the cache memory. Accordingly, the cache server pushes sub-resource 3 to the client device.

Then, the application server transmits the requested resource (i.e. resource 6) to the cache server which, in turn, transmits this resource to the client device.

It is to be noted that the use of wildcard feature may create heavy traffic. Therefore, according to particular embodiments, this option is scoped by a validity limit or some other means.

Figure 15A:
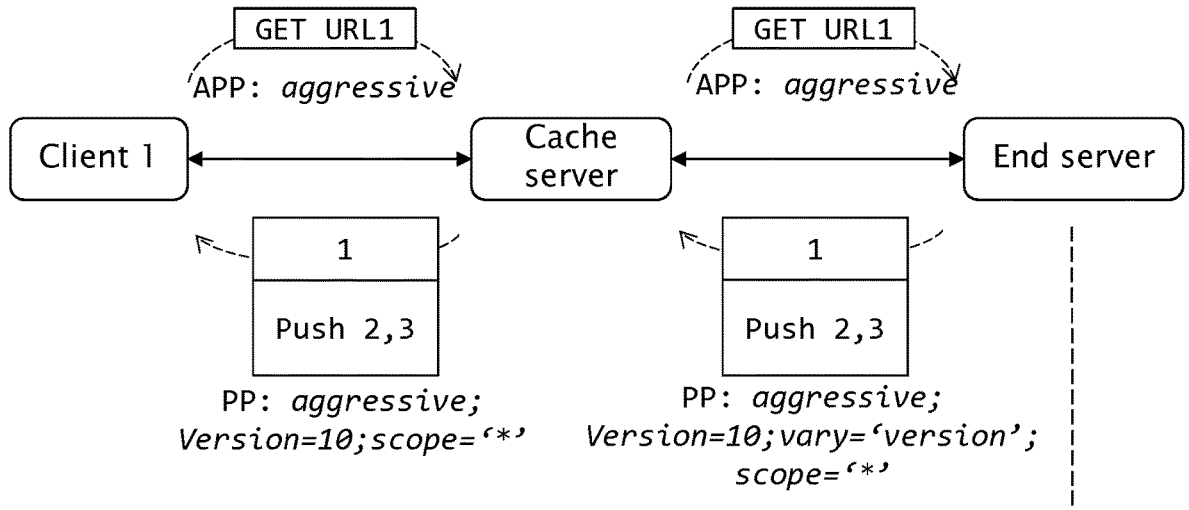
FIGS. 15a and 15b, illustrate a scenario in which a version parameter is used to push resource selectively, that is to say to push only the part of the resources to push that has varied.
Figure 15B:
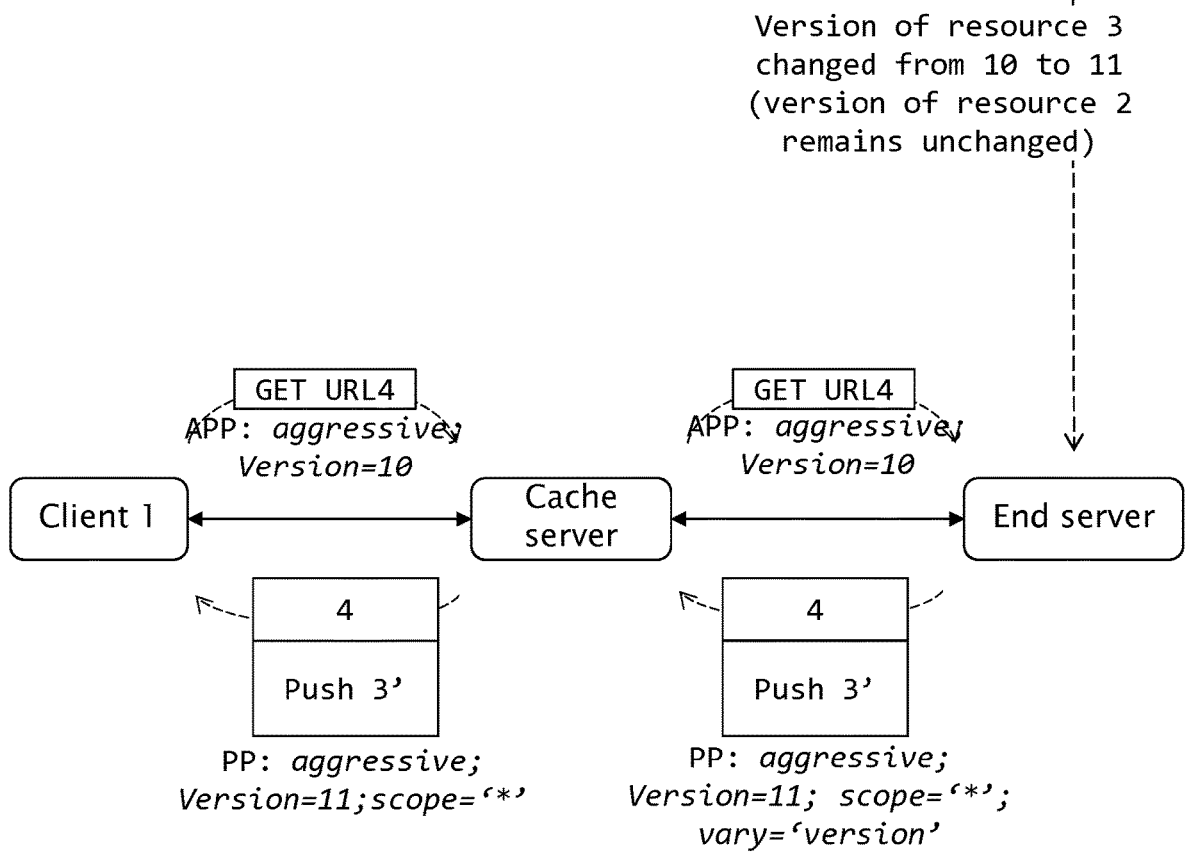

FIG. 15, comprising FIGS. 15a and 15b, illustrates a scenario in which a version parameter is used to push resource selectively, that is to say to push only the part of the resources to push that has varied.

As illustrated in FIG. 15a, the client device denoted 'client 1' sends a request to the cache server to obtain the resource denoted URL1 that contains links to sub-resources 2 and 3. The request contains the 'Accept-Push-Policy' header sets to the value 'aggressive'.

Since the response to this request is not cached, the request is forwarded to the application server.

Based on the received 'Accept-Push-Policy' header set to 'aggressive', the application server uses the push policy 'aggressive' to identify the resources to push (i.e., sub-resources 2 and 3). Accordingly, the application server sends back the response to the request, comprising the requested main resource 1 and the sub-resources 2 and 3.

As illustrated, the application server sets the 'Push-policy' header to 'aggressive'. In addition, the 'Push-policy' header comprises a 'scope' parameter sets to '*' and a 'version' parameter sets to '10'.

When receiving the response and the pushed resources, the cache server forwards them to the client device, stores them in its cache memory and creates links between the resource 1 and the sub-resource 2 and between the resource 1 and the sub-resource 3. These links contain, in particular, a reference to the used push policy, i.e. 'aggressive', and to the parameters used in conjunction with this push policy, i.e. 'scope='*'' and 'version='10''.

When client device 'Client 1' receives the response, it updates its 'Accept-Push-Policy' header reference value to include the 'version' parameter.

For the sake of illustration, it is assumed that the version of sub-resource 3 changed after the client device obtained the resource 1 and sub-resources 2 and 3 (i.e. the new version of sub-reference 3 is 11). The version of sub-resource 2 remains 10.

After a while, client device 'Client 1' sends a request for a new resource (resource 4), as illustrated in FIG. 15b. This request comprises an 'Accept-Push-Policy' header that value is based on the updated 'Accept-Push-Policy' header reference value (i.e. a 'version' parameter set to 10).

Since the requested resource is not cached in the cache server, the request is forwarded to the application server which, in turn, transmits back the requested resource.

Based on the 'version' attribute received in the request, the application server does not push resource 2 again (since its version has not changed) but pushes an updated version of the document 3, denoted 3'.

Upon reception of the requested resource and of the updated pushed resource, the cache server updates its cache memory and forwards resource 4 and sub-resource 3' to the client device.

A main advantage of using 'version' parameter as illustrated in FIG. 15 is that previously pushed resources are not pushed again unless their version changes. This results in optimizing the bandwidth. In other words, the 'version' parameter is used as a lightweight mechanism to exchange cache information available at the client device end.

It is to be noted that although the illustrated example is using numbers for version attribute, this mechanism may be extended to hash values, like what it is done for ETags. It could also be noted that the 'version' information makes it possible for the end server to push resources using delta encoding (e.g. encoding conforming to the RFC 3229 standard) which may further save bandwidth.

An alternative for handling changes in a push policy is to indicate it inside the 'Push-Policy' header field. In such a case, two cases may happen for the example of update described by reference to FIG. 15: either the sub-resource 3 is updated and the application server wants to push the new version, or it is replaced by a new sub-resource (e.g. resource 5). The cache server needs to know which case is occurring when receiving the new response from the application server. This can be indicated, for example, by adding a parameter to the 'Push-Policy' header field.

If the change results from an update of sub-resource 3 then the 'Push-Policy' header field contains the 'update' parameter.

If the change result from the replacement of sub-resource 3 by sub-resource 5 then the 'Push-Policy' header field contains no specific parameter, but the application server pushes all the sub-resources identified by the push policy. This means the application server pushes sub-resources 2 and 5. As an alternative, the 'Push-Policy' header field may contain an 'add' parameter listing the sub-resources added to the push policy and a 'remove' parameter listing the sub-resources removed from the push policy. In this example, the 'Push-Policy' would contain 'add=5; remove=3'.

This solution for handling changes can either be applied to modify the list of pushed sub-resources of a specific resource or to modify the list of pushed sub-resources associated with a given push policy version.

As described by reference to FIGS. 16 and 17, sub-resources may be handled by groups.

Figure 16A:
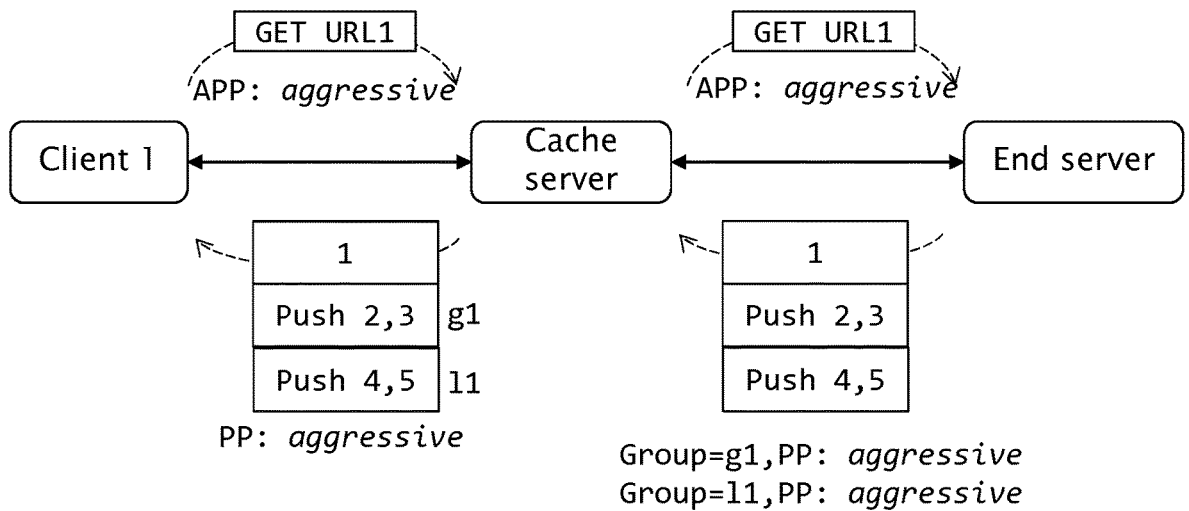
FIGS. 16a, 16b, and 16c, illustrate a first scenario in which sub-resources to push are identified by groups of sub-resources.
Figure 16B:
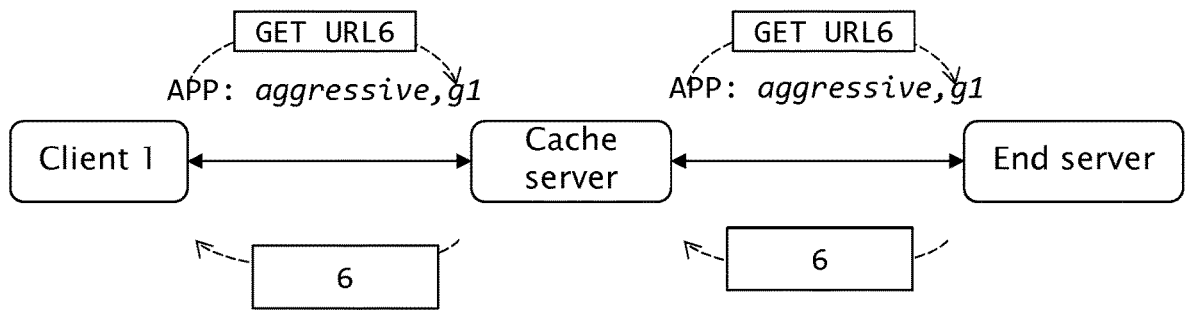
Figure 16C:
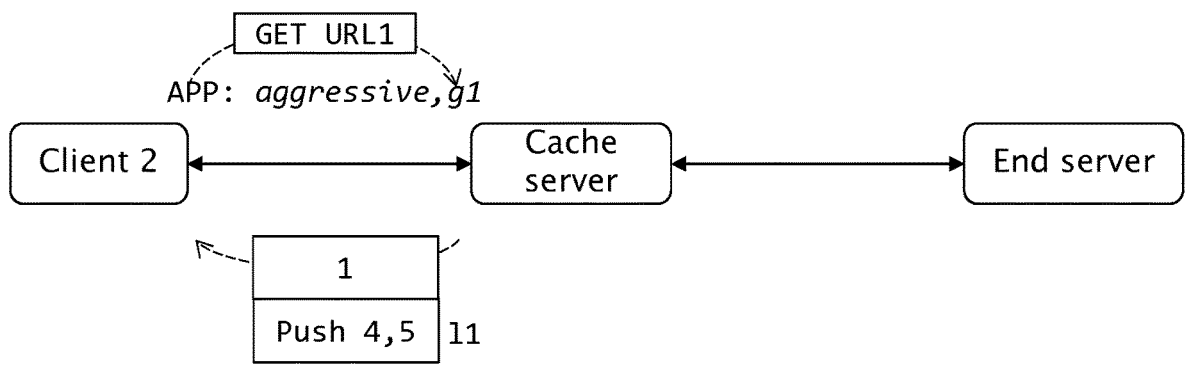

FIG. 16, comprising FIGS. 16a, 16b, and 16c, illustrates a first scenario in which sub-resources to push are identified by groups of sub-resources.

As illustrated in FIG. 16a, the client device denoted 'client 1' sends a request to the cache server to obtain the resource denoted URL1 that contains links to sub-resources 2, 3, 4, and 5. The request is sent with an application specific push policy according to which the 'Accept-Push-Policy' header is set to the value 'aggressive'.

Since the response to this request is not cached, the request is forwarded to the application server.

Based on the received 'Accept-Push-Policy' header set to 'aggressive', the application server uses the push policy 'aggressive' to identify the resources to push (i.e., sub-resources 2 to 5). Accordingly, the application server sends back the response to the request, comprising the requested main resource 1 and the sub-resources 2 to 5.

As illustrated, sub-resources 2 and 3 are grouped in group 'g1' and sub-resources 4 and 5 are grouped in group 'l1'.

According to this example, group 'g1' is global which means that this group of sub-resources may be pushed in response to a request for another resource sent to the application server. On the contrary, it is assumed that group 'l1' is local which means that only the requested resource (i.e. resource 1) requires these sub-resources. Determining whether a group is a local group or a global group can be done as a function of the name of the group ('g' for global, 'l' for local) or through other means (e.g. a Boolean flag or a prefix for the group name such as 'L/' for local groups).

It is to be noted that the application server may push several global or local groups in response to a single request.

As illustrated in FIG. 16a, a 'Push-Policy' header is set for each group. In the given example the 'Push-Policy' headers set for the two groups are the same (i.e. 'aggressive').

When receiving the response and the pushed resources, the cache server forwards them to the client device, stores them in its cache memory and creates links between the resource 1 and each of the sub-resources 2 to 5. These links contain, in particular, a reference to the used push policy, i.e. 'aggressive', that depends on the group to which belongs the sub-resource.

When the same client device 'Client 1' requests a new resource (e.g. resource 6), as illustrated in FIG. 16b, the request advantageously comprises an 'Accept-Push-Policy' header that includes the indication according to which 'Client 1' has already received the group g1.

Since the response to this new request is not cached, the request is forwarded to the application server.

In response, the application server transmits back the requested resource to the cache server but does not push any sub-resource since it is assumed that resource 6 only requires sub-resources of the global group 'g1' and it has been notified by the 'Accept-Push-Policy' header that sub-resources belonging to the group 'g1' are stored within the client device.

However, the application server indicates in the response that the requested resource 6 is using the global group 'g1'.

This makes it possible for the cache server to replicate the push policy for another client device different from 'Client 1'.

Accordingly, this update of the 'Accept-Push-Policy' header by the client device makes it possible to further optimize the accuracy of the push policy and thus, to save bandwidth.

According to particular embodiments, the client device includes in its requests all the global groups it has received. This can be transmitted as a parameter of the 'Accept-Push-Policy' header field, for example 'groups=g1+g2', or inside a specific header field, for example 'Groups: g1, g2'.

When another client device 'Client 2' requests the same resource as the one previously requested by 'Client 1' (e.g. resource 1), as illustrated in FIG. 16c, the request comprising an 'Accept-Push-Policy' header set to 'aggressive, g1', the cache server sends back the requested resource without communicating with the application server. It also pushes the sub-resources of the local group 'l1', without pushing the sub-resources of the global group 'g1' already stored by 'Client 2', still without communicating with the application server.

It is to be noted that if 'Client 2' sets its 'Accept-Push-Policy' header to 'aggressive' in its request, the cache server replicates the push policy of the application server by pushing sub-resources of groups 'g1' and 'l1'.

It is also to be noted that if 'Client 2' requests a resource that is not present in the cache memory of the cache server, the request comprising an 'Accept-Push-Policy' header set to 'aggressive', the cache server transmits the request to the application server while adding a reference to the global group 'g1' to the 'Accept-Push-Policy' header field in order to avoid the transmission of sub-resources belonging to this group.

Figure 17A:
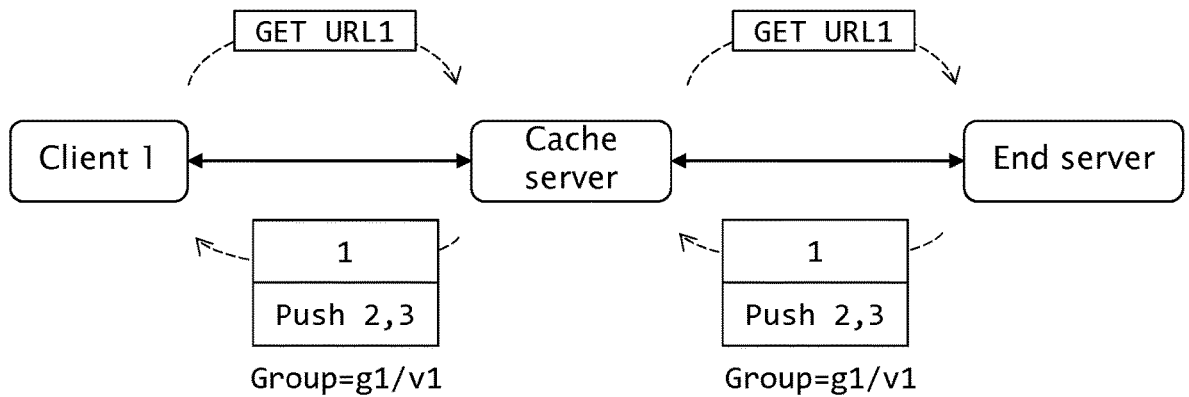
FIGS. 17a, 17b, and 17c, illustrate a second scenario in which sub-resources are handled by groups of sub-resources.
Figure 17B:
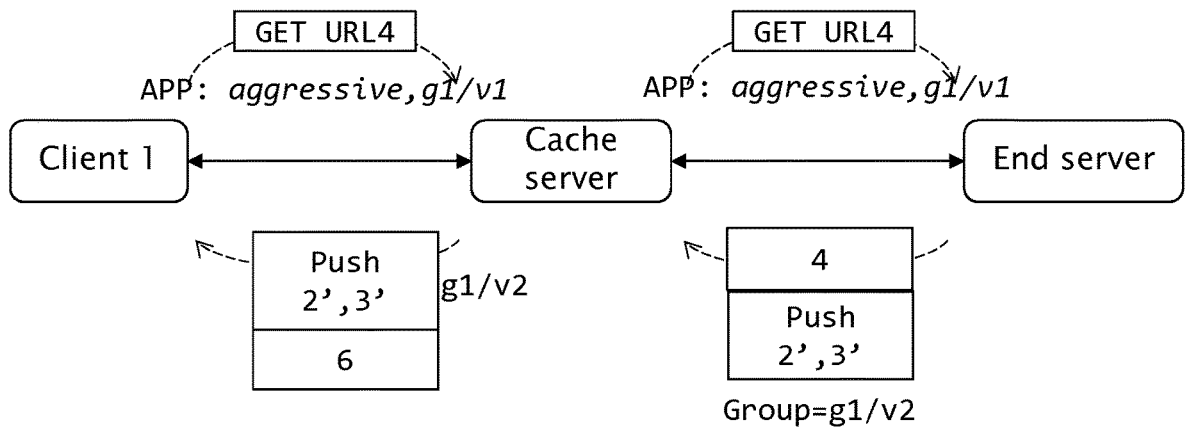
Figure 17C:
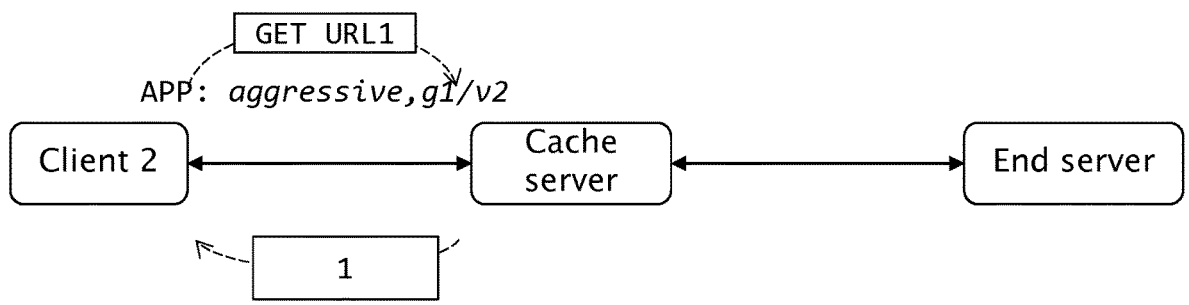

FIG. 17, comprising FIGS. 17a, 17b, and 17c, illustrates a second scenario in which sub-resources are handled by groups of sub-resources.

As illustrated in FIG. 17, push groups can also be versioned. This may be useful when some files are actually updated.

According to the example of FIG. 17a, the client device denoted 'client 1' sends a request to the cache server to obtain the resource denoted URL1 that contains links to sub-resources 2 and 3. The request is sent without specific push policy, that is to say without 'Accept-Push-Policy' header.

Since the response to this request is not cached, the request is forwarded to the application server.

In response, the application server sends back the response to the request, comprising the requested main resource 1 and the sub-resources 2 and 3 that belongs to global group 'g1' with a version set to 'v1'.

The version of a group can be indicated in a clearly separated part of the group's name so that updating the group is easier. For the sake of illustration, a group name can include a first part corresponding to the group identifier (for example 'g1'), a second part consisting in a separator (for example '/'), and then a third part corresponding to a version identifier (for example 'v1').

The version of the group may or may not be included in the metadata associated with the requested resource. However, according to particular embodiments, the version is included in the metadata associated with each pushed resource.

When the same client requests another resource, for example resource 4, as illustrated in FIG. 17b, the 'Accept-Push-Policy' header is set to 'aggressive, g1/v1'. Since the requested resource is not stored within the cache memory of the cache server, the latter forwards the request to the application server which sends back the requested resource (resource 4) and updated versions of sub-resources 2 and 3, denoted 2' and 3'. In turn, the cache server forwards the resource 4 and sub-resources 2' and 3' to the client device.

Accordingly, the group has a new version, 'v2' that is sent to the client device along with the sub-resources. This makes it possible for the client device to indicate in its 'Accept-Push-Policy' header of a following request which version of the group it has.

It is to be noted that sub-resources 2' and 3' may be transmitted using delta encoding and sub-resources 2 and 3 as a base.

When a group is updated, all the resources of the group are pushed again. Resources added to the group are pushed as part of the group for the first time. Resources removed from the group are not pushed anymore as part of the group. Updated or unchanged resources are pushed again as part of the group. This can be done according to the examples given in reference to FIG. 16. Possibly, the transmission of resources already pushed can be optimized, for example using some delta encoding.

If another client device denoted 'Client 2' sends a request for the resource 1 and sets its 'Accept-Push-Policy' header to 'aggressive; g1/v2', as illustrated in FIG. 17c, the cache server is able to replay the push strategy (that has been played for the same requested resource and another client device) without communicating with the application server. To that end, it verifies that the links are matching the 'aggressive' push policy and that the validated resources are not contained in the 'g1/v2' group.

Figure 18:
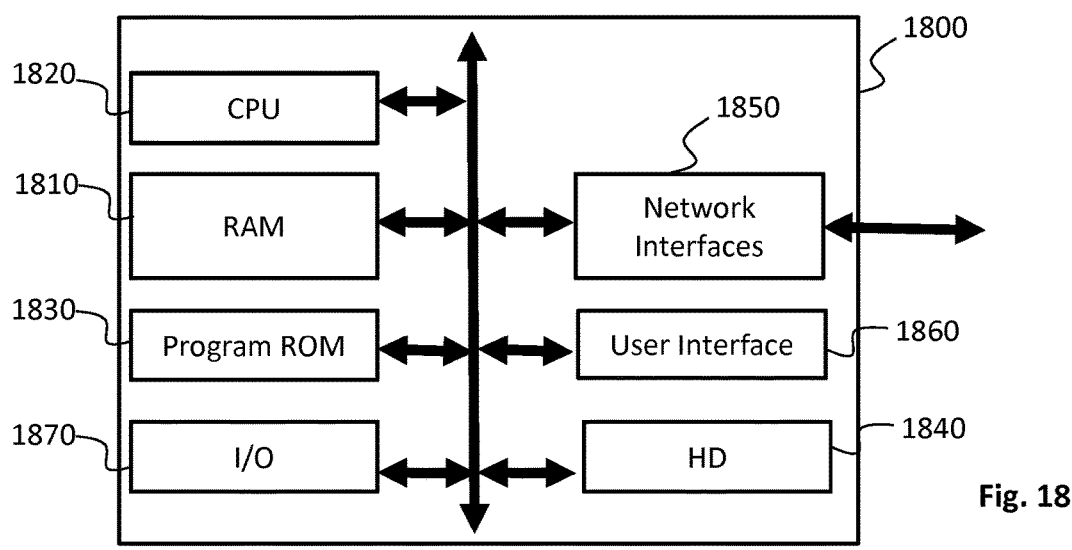
FIG. 18 is a schematic illustration of devices according to embodiments.

FIG. 18 is a schematic illustration of a device 1800 according to embodiments. The device may be an application server, a client or a cache server. The device comprises a RAM memory 1810 which may be used as a working memory for a control unit 1820 configured for implementing a method according to embodiments. For example, the control unit may be configured to execute instructions of a computer program loaded from a ROM memory 1830. The program may also be loaded from a hard drive 1840.

The device also comprises a network interface 1850 which may be a single network interface, or comprise a set of network interfaces (for instance several wireless interfaces, or several types of wired or wireless interfaces). The device may comprise a user interface 1860 for displaying information to a user and for receiving inputs from the user.

The device may also comprise an input/output module 1870 for receiving and/or sending data from/to external devices.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims. It is to be noted that resources or main resources may be sub-resources of other resources and that sub-resources or auxiliary resources may be requested as main resources.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for pushing at least one resource associated with a main resource, in response to a request for this main resource, the method being carried out in an intermediary component comprising a cache memory, the method comprising:
receiving a request for a main resource and a recommendation comprising a preferred push policy;
obtaining from the cache memory a list of at least one resource linked to the main resource;
obtaining from the cache memory, an indication associated with the at least one resource, the indication comprising a push policy defined by the application server; and
pushing the at least one resource stored in the cache memory in response to a comparison of the indication associated with the at least one resource with the recommendation comprising the preferred push policy,
wherein the at least one resource, the link between the at least one resource and the main resource, and the indication associated with the at least one resource are stored in the cache memory, following reception from an application server in response to another request for the main resource.

2. The method of claim 1, further comprising a step of transmitting the indication associated with the at least one resource.

3. The method of claim 1, further comprising steps of,
establishing a link between the main resource and a resource to push; and
associating with the linked resource to push an indication comprising a push policy defined by an application server, enabling the selection of the resource to push as a function of a recommendation comprising a preferred push policy.

4. The method of claim 3, further comprising a step of receiving the indication comprising a push policy defined by an application server.

5. The method of claim 4, wherein the indication comprising a push policy defined by an application server is received from the application server, directly or indirectly.

6. The method of claim 1, further comprising a step of transmitting the indication used to identify the at least one pushed resource.

7. The method of claim 1, further comprising a step of selecting a subset of resources to push among a set of resources to push, the subset of resources to push being selected in response to the comparison of an item of information of the indication, different from the push policy, with the recommendation, or in response to the comparison of an item of information of the indication, different from the push policy, with an item of information of the recommendation, different from the preferred push policy.

8. The method of claim 7, wherein the item of information of the indication is received along with this resource to push.

9. The method of claim 7, wherein the item of information of the recommendation is received along with the request for the main resource.

10. The method of claim 1, further comprising a step of identifying from the cache memory at least one resource as a function of an indication associated with another resource, the indication associated with the other resource comprising a push policy defined by an application server, and a step of transmitting the identified resource.

11. The method of claim 1, wherein the indications and the recommendations are received and transmitted as header parameters.

12. A device for pushing at least one resource associated with a main resource, in response to a request for this main resource, the device comprising a cache memory and a processor configured for carrying out the steps of:
receiving a request for a main resource and a recommendation comprising a preferred push policy;
obtaining from the cache memory a list of at least one resource linked to the main resource;
obtaining, from the cache memory, an indication associated with the at least one resource, the indication comprising a push policy defined by the application server; and
pushing the at least one resource stored in the cache memory in response to a comparison of the indication associated with the at least one resource with the recommendation comprising the preferred push policy,
wherein the at least one resource, the link between the at least one resource and the main resource, and the indication associated with the at least one resource are stored in the cache memory, following reception from an application server in response to another request for the main resource.

13. The device of claim 12, wherein the processor is further configured to carry out a step of transmitting the indication associated with the at least one resource.

14. The device of claim 12, wherein the processor is further configured to carry out steps of,
establishing a link between the main resource and a resource to push; and
associating with the linked resource to push an indication comprising a push policy defined by an application server, enabling the selection of the resource to push as a function of a recommendation comprising a preferred push policy.

15. The device of claim 14, wherein the processor is further configured to carry out a step of receiving the indication comprising a push policy defined by an application server.

16. The device of claim 12, wherein the processor is further configured to carry out a step of transmitting the indication used to identify the at least one pushed resource.

17. The device of claim 12, wherein the processor is further configured to carry out a step of selecting a subset of resources to push among a set of resources to push, the subset of resources to push being selected in response to the comparison of an item of information of the indication, different from the push policy, with the recommendation, or in response to the comparison of an item of information of the indication, different from the push policy, with an item of information of the recommendation, different from the preferred push policy.

18. The device of claim 12, wherein the processor is further configured to carry out a step of identifying from the cache memory at least one resource as a function of an indication associated with another resource, the indication associated with the other resource comprising a push policy defined by an application server, and a step of transmitting the identified resource.

19. The device of claim 12, wherein the processor is configured so that the indications and the recommendations are received and transmitted as header parameters.

* * * * *